United States Patent
Nanda et al.

(10) Patent No.: US 10,036,283 B2
(45) Date of Patent: Jul. 31, 2018

(54) SYSTEM AND METHOD FOR DIFFUSER AFT PLATE ASSEMBLY

(71) Applicant: General Electric Company, Schenectady, NY (US)

(72) Inventors: Deepesh Dinesh Nanda, Bangalore (IN); Robert Jamiolkowski, Zabki (PL); Robert Jacek Zreda, Warsaw (PL); Eric Yves Bracquemart, Belfort (FR); Daniel Tomasz Ozga, Warsaw (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 113 days.

(21) Appl. No.: 15/152,264

(22) Filed: May 11, 2016

(65) Prior Publication Data

US 2017/0145864 A1    May 25, 2017

Related U.S. Application Data

(63) Continuation-in-part of application No. 14/951,090, filed on Nov. 24, 2015, and a continuation-in-part of application No. 14/951,151, filed on Nov. 24, 2015, and a continuation-in-part of application No. 14/951,164, filed on Nov. 24, 2015, and a continuation-in-part of application No. 14/951,173, filed on Nov. 24, 2015.

(51) Int. Cl.
*F01D 25/30* (2006.01)
*F01D 25/24* (2006.01)
*F02C 3/04* (2006.01)

(52) U.S. Cl.
CPC .............. *F01D 25/30* (2013.01); *F01D 25/24* (2013.01); *F02C 3/04* (2013.01); *F05D 2220/32* (2013.01)

(58) Field of Classification Search
CPC .......... F01D 25/24; F01D 25/28; F01D 25/30; F02C 3/04; F05D 2220/32
See application file for complete search history.

(56) References Cited

U.S. PATENT DOCUMENTS

| | | | |
|---|---|---|---|
| 5,588,799 A | 12/1996 | Kreitmeier | |
| 5,603,605 A | 2/1997 | Fonda-Bonardi | |
| 5,933,699 A | 8/1999 | Ritter et al. | |
| 6,065,756 A | 5/2000 | Eignor et al. | |
| 6,834,507 B2 | 12/2004 | Jorgensen | |
| 7,934,904 B2 | 5/2011 | Demiraydin et al. | |

(Continued)

FOREIGN PATENT DOCUMENTS

GB    871733 A    6/1961

*Primary Examiner* — Richard Edgar
(74) *Attorney, Agent, or Firm* — Fletcher Yoder, P.C.

(57) ABSTRACT

A method includes inserting axially a radially interior surface of an aft plate assembly into a circumferential groove of an inner barrel of a diffuser section of a gas turbine, where the aft plate assembly is inserted into a first circumferential orientation relative to the circumferential groove, and the circumferential groove is disposed on a radially exterior surface of the inner barrel. The method includes rotating the aft plate assembly circumferentially within the circumferential groove from the first circumferential orientation to a second circumferential orientation, where the inner barrel is configured to axially retain the aft plate assembly when the aft plate assembly is disposed in the second circumferential orientation.

20 Claims, 16 Drawing Sheets

(56) References Cited

U.S. PATENT DOCUMENTS

| | | | |
|---|---|---|---|
| 7,980,055 B2* | 7/2011 | Lindenfeld | F01D 25/30 415/126 |
| 2002/0127100 A1 | 9/2002 | Kreitmeier | |
| 2009/0053046 A1 | 2/2009 | Black et al. | |
| 2010/0132376 A1 | 6/2010 | Durocher et al. | |
| 2011/0005234 A1 | 1/2011 | Hashimoto et al. | |
| 2011/0142604 A1* | 6/2011 | Schumnig | F01D 25/24 415/170.1 |
| 2012/0034064 A1 | 2/2012 | Nanda et al. | |
| 2012/0063893 A1 | 3/2012 | Pruthi et al. | |
| 2012/0292860 A1* | 11/2012 | Moehrle | F01D 9/023 277/640 |
| 2012/0308374 A1 | 12/2012 | Bunel et al. | |
| 2013/0091864 A1* | 4/2013 | Auzelyte | F23J 13/04 60/798 |
| 2014/0003931 A1* | 1/2014 | Bruhwiler | F01D 25/30 415/211.2 |
| 2014/0026999 A1 | 1/2014 | Frailich et al. | |
| 2015/0354597 A1 | 12/2015 | I | |
| 2017/0145864 A1 | 5/2017 | Nanda et al. | |

\* cited by examiner

SYSTEM AND METHOD FOR DIFFUSER AFT PLATE ASSEMBLY

CROSS-REFERENCE TO RELATED APPLICATIONS

This application is a Continuation in Part of U.S. patent application Ser. No. 14/951,090, entitled "SYSTEM AND METHOD FOR TURBINE DIFFUSER," filed Nov. 24, 2015, U.S. patent application Ser. No. 14/951,151, entitled "SYSTEM OF SUPPORTING TURBINE DIFFUSER," filed Nov. 24, 2015, U.S. patent application Ser. No. 14/951, 164, entitled "SYSTEM OF SUPPORTING TURBINE DIFFUSER OUTLET," filed Nov. 24, 2015, and U.S. patent application Ser. No. 14/951,173, entitled "SYSTEM OF SUPPORTING TURBINE DIFFUSER," filed Nov. 24, 2015, which are herein incorporated by reference in their entirety.

BACKGROUND

The subject matter disclosed herein relates to gas turbine engines, such as an improved diffuser section.

Gas turbine systems generally include a compressor, a combustor, and a turbine. The compressor compresses air from an air intake, and subsequently directs the compressed air to the combustor. The combustor combusts a mixture of compressed air and fuel to produce hot combustion gases directed to the turbine to produce work, such as to drive an electrical generator.

Traditional diffuser sections of the turbine are subject to high stresses due to the configuration of the diffuser section and high temperatures associated with the exhaust gases. Accordingly, traditional diffuser sections experience high stresses, thereby increasing the wear on the diffuser section.

BRIEF DESCRIPTION

In one embodiment, a method includes inserting axially a radially interior surface of an aft plate assembly into a circumferential groove of an inner barrel of a diffuser section of a gas turbine, where the aft plate assembly is inserted into a first circumferential orientation relative to the circumferential groove, and the circumferential groove is disposed on a radially exterior surface of the inner barrel. The method includes rotating the aft plate assembly circumferentially within the circumferential groove from the first circumferential orientation to a second circumferential orientation, where the inner barrel is configured to axially retain the aft plate assembly when the aft plate assembly is disposed in the second circumferential orientation.

In one embodiment, a system includes a diffuser section configured to receive an exhaust gas from a turbine section, where the diffuser section includes an aft plate assembly comprising a radially interior surface, where the radially interior surface comprises a first notch and a first ridge. The diffuser section comprises an inner barrel including a circumferential groove disposed on a radially exterior surface, where the circumferential groove includes an upstream lip and a downstream lip comprising a second notch and a second ridge. The first ridge is configured to be disposed in the circumferential groove when the aft plate assembly is disposed in a first circumferential orientation and a second circumferential orientation relative to the inner barrel, the first ridge is axially aligned with the second notch in the first circumferential orientation, and the first ridge is circumferentially offset from the second notch in the second circumferential orientation.

In one embodiment, a system includes a diffuser section configured to receive an exhaust gas from a turbine section, where the diffuser section includes a forward plate, and an aft plate assembly comprising a radially interior surface, where the radially interior surface comprises a first plurality of notches and a first plurality of ridges. The diffuser section includes an inner barrel including a circumferential groove disposed on a radially exterior surface, where the circumferential groove includes an upstream lip, and a downstream lip including a second plurality of notches and a second plurality of ridges. The diffuser section includes a plurality of poles coupled between the forward plate and the aft plate assembly when the aft plate assembly is disposed in a second circumferential configuration relative to the inner barrel, where the first plurality of ridges is configured to be disposed in the circumferential groove when the aft plate assembly is disposed in a first circumferential orientation and the second circumferential orientation relative to the inner barrel, the first plurality of ridges is axially aligned with the second plurality of notches in the first circumferential orientation, and the first plurality of ridges is circumferentially offset from the second plurality of notches in the second circumferential orientation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
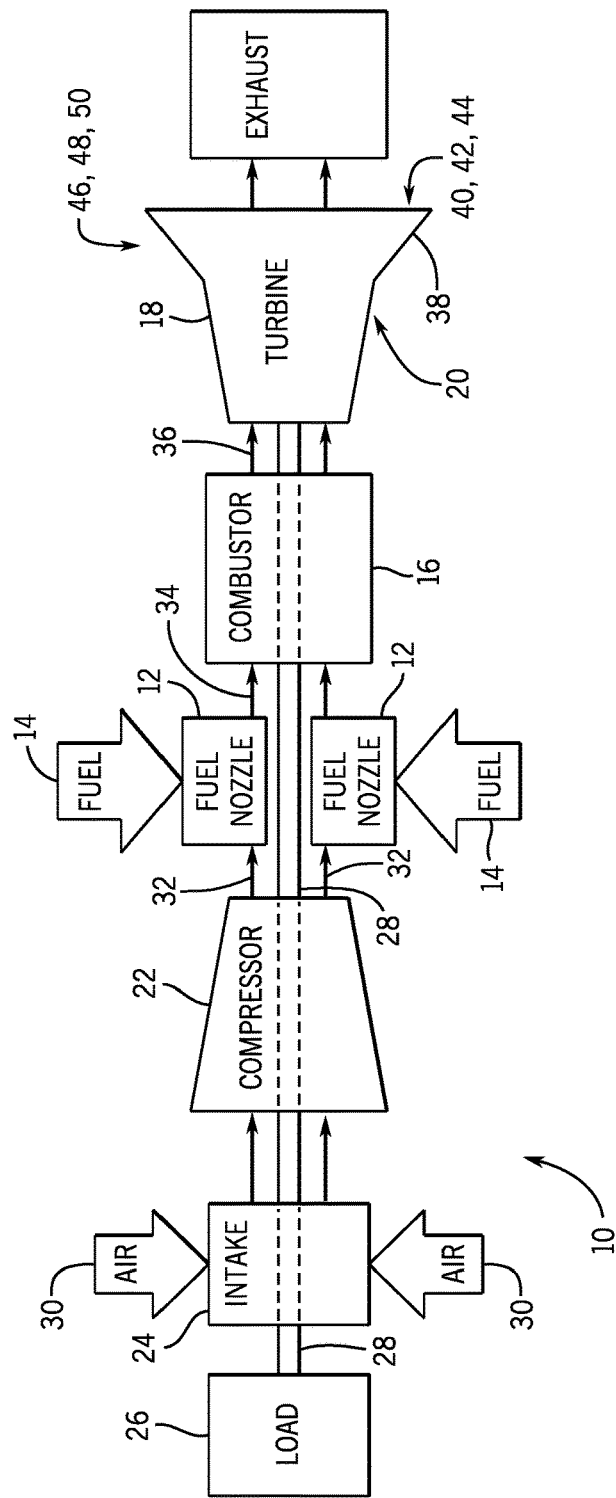
FIG. 1 is a block diagram of an embodiment of a turbine system having a turbine that includes a modified diffuser section.

A system and methods for improving traditional diffuser sections through utilization of mechanical improvements on the diffuser section is described in detail below. The mechanical improvements to the diffuser section contribute to improved mechanical integrity of the diffuser by reducing stresses associated with a traditional diffuser design. The mechanical improvements to the diffuser include an aft plate assembly with notches and ridges to facilitate axial installation of the aft plate to an inner barrel. The aft plate may be inserted axially through notches of a circumferential groove of the inner barrel of the diffuser section, then rotated circumferentially within the circumferential groove such that ridges of the aft plate axially retain the aft plate assembly. Other mechanical improvements include manufacturing a desired curvature of the diffuser section, disposing a plurality of poles between a forward plate and the aft plate of the diffuser, a circumferential groove disposed in the inner barrel to receive the aft plate, a circumferential lap joint of the outer barrel, a plurality of discrete brackets disposed along the inner barrel and/or the outer barrel of the diffuser configured to couple the diffuser to the turbine outlet, or any combination thereof. The curvature of the diffuser section is implemented by a machine process, such as a spinning process. The spinning process involves molding a suitable material (e.g., stainless steel, metal) for the inner barrel and the outer barrel into the desired shape (e.g., curved) by placing the material over a mold. The material is then molded into the desired shape by utilizing a roller to press the material into the mold, thereby gradually forming the desired mold shape. To reduce any residual stresses encountered via the spinning process, the inner and outer barrels may be formed from various axial segments (e.g., first plurality of axial segments, second plurality of axial segments). Utilizing axial segments to create the inner barrel and the outer barrel may require less deformation of the material to create the desired shape of the inner barrel and the outer barrel, thereby contributing to reducing the amount of residual stresses that occur.

Once the axial segments (e.g., first plurality of axial segments, second plurality of axial segments) of the inner barrel and the outer barrel are formed, the axial segments of each respective barrel may be joined together. The axial segments may be cut to ensure the axial segments (e.g., first plurality of axial segments, second plurality of axial segments) have excess material so that the segments can be adequately joined together. The axial segments by be joined together by welding, brazing, fusing, bolting, fastening, or any combination thereof.

The poles are disposed between the inner barrel and the outer barrel, which are in turn disposed around the turbine axis. The poles serve to couple the downstream end of the aft plate to the downstream end of the forward plate via the plurality of poles and are circumferentially spaced about the turbine axis. In some embodiments, the poles have varying pole diameters. The pole diameter is based in part on the circumferential location of the pole location along the diffuser (e.g., the outer aft plate, the inner aft plate). For example, the diameter of the poles nearest a top portion of the diffuser (e.g., the outer aft plate, the inner aft plate) may have a larger diameter than the poles nearest a bottom portion of the diffuser. In some embodiments, the pole diameters are smaller due to their proximity to flow of the exhaust gases. As such, smaller pole diameters may be beneficial by reducing blockage of the exhaust flow path due to the smaller diameters. The poles disposed within the top portion of the diffuser section may be configured to support the load (e.g., weight) of the diffuser section, such as during installation. For example, the poles disposed within the top portion of the diffuser section may be utilized to lift the diffuser section. In some embodiments, the poles disposed within the top portion of the diffuser section may be coupled to a hoist, lift, crane, or other suitable lifting machine to translate the diffuser section to a suitable location (e.g., translation for installation, removal, service, repair). The poles may reduce vibration between the inner barrel and the outer barrel. The arrangement of the poles depends in part on the diameters of the poles. The poles nearest the top portion of the diffuser have larger diameter to bypass vortex shedding frequencies where the velocity of the exhaust gases is more uniform.

The circumferential groove is located at an end of the inner barrel. The aft plate may be inserted into the circumferential groove, such that the aft plate interfaces with portions of the root of the circumferential groove. The circumferential groove may reduce stress by enabling the aft plate to move within the circumferential groove. The hoop stresses may be reduced in the region by enabling slight movement between the sections (e.g., the aft plate and the circumferential groove). The stress reduction from implementing the circumferential groove may reduce hoop stresses by as much as one-half relative to a diffuser without the circumferential groove. In some embodiments, the aft plate may be formed as an aft plate assembly. For example, the aft plate assembly may include a plurality of aft plate segments arranged to form an annular aft plate assembly. The aft plate assembly may include a plurality of notches and ridges. The aft plate segments may enable some leakage of the exhaust gases through openings (e.g., the ridges) into the exhaust plenum. This leakage may reduce the amount of thermal stresses in the area by enabling a controlled leakage of the hot exhaust gases to pass through the openings. The aft plate assembly may be inserted axially into a first circumferential orientation relative to the circumferential groove. The aft plate assembly may rotate circumferentially within the circumferential groove from the first circumferential orientation to a second circumferential orientation. The inner barrel may be configured with the ridges and notches to axially retain the aft plate assembly when the aft plate assembly is disposed in the second circumferential orientation.

The circumferential lap joint is disposed between the downstream end of the outer wall of the turbine outlet and the upstream end of the outer barrel of the diffuser section. The circumferential lap joint is configured to facilitate axial movement of the outer barrel relative to the outer wall, thereby relieving stress in the outer barrel. An upstream lip (e.g., outer lip) of the outer barrel may be disposed radially within a downstream lip (e.g., lip) of the outer wall to facilitate ease of axial movement of the lap joint. The stress reduction by use of the upstream lip and the downstream lip of the circumferential lap join may be further increased by the use of discrete brackets. The discrete brackets may be coupled to the outer barrel and a frame assembly (e.g., exhaust frame). The discrete brackets (e.g., outer barrel discrete brackets) are configured to support the outer barrel in the axial direction. A subset of the discrete brackets (e.g., discrete inner brackets) may be disposed circumferentially around the inner barrel of the diffuser. The discrete inner brackets (e.g., the inner barrel support brackets) may hold the diffuser (e.g., inner barrel) in place and reduce movement in the axial direction. The movement of the diffuser (e.g., the inner barrel and the outer barrel) relative to the turbine outlet may be reduced and/or restrained depending on where the lap joint and discrete bracket are disposed along the outer barrel.

Turning now to the drawings and referring first to FIG. 1, a block diagram of an embodiment of a gas turbine system 10 is illustrated. The diagram includes a fuel nozzle 12, fuel 14, and a combustor 16. As depicted, fuel 14 (e.g., a liquid fuel and/or gas fuel, such as natural gas) is routed to the turbine system 10 through the fuel nozzle 12 into the combustor 16. The combustor 16 ignites and combusts the air-fuel mixture 34, and then passes hot pressurized exhaust gas 36 into a turbine 18. The exhaust gas 36 passes through turbine blades of a turbine rotor in the turbine 18, thereby driving the turbine 18 to rotate about the shaft 28. In an embodiment, a modified diffuser 38 is coupled to the turbine 18. The turbine 18 is coupled to a turbine outlet, where the turbine outlet and the diffuser 38 are configured to receive the exhaust gases 36 from the turbine 18 during operation. As discussed in detail below, embodiments of a turbine system 10 include certain structures and components within the diffuser 38 that improve the reliability associated with manufacturing the diffuser 38 (e.g., by reducing stress). Embodiments of the turbine system 10 may include certain structures and components of the diffuser 38 to improve the production time of the diffuser 38. The exhaust gas 36 of the combustion process may exit the turbine system 10 via the diffuser 38 and the exhaust outlet 20. In some embodiments, the diffuser 38 may include a circumferential groove 40, one or more lap joints 42, one or more discrete brackets 44, one or more poles 46 disposed between an aft plate 62 and a forward plate 64 of the diffuser 38, or any combination thereof. The rotating blades of the turbine 18 cause the rotation of shaft the 28, which is coupled to several other components (e.g., compressor 22, load 26) throughout the turbine system 10.

In an embodiment of the turbine system 10, compressor vanes or blades are included as components of the compressor 22. Blades within compressor the 22 may be coupled to the shaft 28 by a compressor rotor, and will rotate as the shaft 28 is driven by the turbine 18. The compressor 22 may intake oxidant (e.g., air) 30 to the turbine system 10 via an air intake 24. Further, the shaft 28 may be coupled to the load 26, which may be powered via rotation of the shaft 28. As appreciated, the load 26 may be any suitable device that may generate power via the rotational output of the turbine system 10, such as a power generation plant or an external mechanical load. For example, the load 26 may include an external mechanical load such as an electrical generator. The air intake 24 draws the oxidant (e.g., air) 30 into the turbine system 10 via a suitable mechanism, such as a cold air intake, for subsequent mixture of air 30 with fuel 14 via the fuel nozzle 12. The oxidant (e.g., air) 30 taken in by turbine system 10 may be fed and compressed into pressurized air 32 by rotating blades within compressor 22. The pressurized air 32 may then be fed into one or more fuel nozzles 12. The fuel nozzles 12 may then mix the pressurized air 32 and fuel 14, to produce a suitable air-fuel mixture 34 for combustion.

Figure 2:
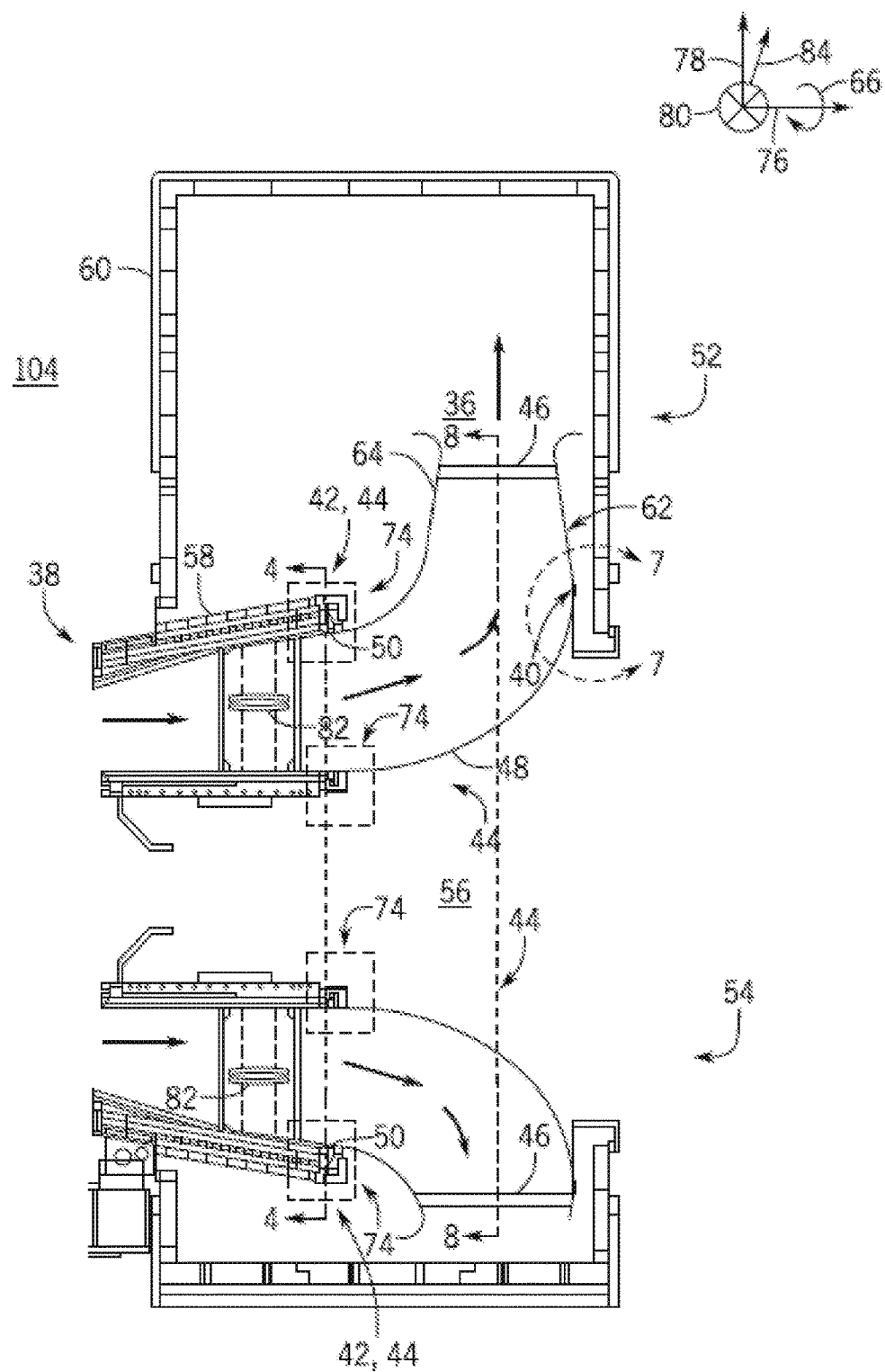
FIG. 2 is a detailed diagram of the diffuser section of the turbine disposed within an exhaust plenum.

FIG. 2 illustrates a detailed diagram of the diffuser 38 section of the turbine 18. As depicted, the diffuser section 38 may include an upper portion 52 and a lower portion 54, which are shown as separated by a ventilated bearing tunnel 56. The ventilated bearing tunnel 56 may supply a cooling flow through the turbine outlet 20 and the diffuser section 38. It may be appreciated that the diffuser 38 has a substantially annular shape that encloses a portion of the bearing tunnel 56. The upper portion 52 of the diffuser 38 is coupled to an exhaust frame 58 and is radially disposed within an exhaust plenum 60. The exhaust gases 36 exit through the upper and lower sections 52, 54 of the diffuser 38 into the exhaust plenum 60. The aft plate 62 of the diffuser section 38 is also disposed in the plenum 60. The inner barrel 48 may be cooler than the outer barrel 50, particularly along portions of the inner barrel 48 further away from the turbine outlet 20 in part due to insulation applied to the inner barrel 48. As such, the aft plate 62 may absorb heat more quickly than the inner barrel 48 contributing to a thermal gradient across the diffuser 38. This thermal gradient may cause stresses in the diffuser 38, thereby affecting the mechanical integrity of the diffuser 38.

The mechanical integrity of the diffuser 38 may also be affected by stresses related to the attenuation length from an air foil 82 disposed within the diffuser 38 and a vertical joint 74 of the exhaust frame 58. The flow path of the hot exhaust gases 36 may further reduce the mechanical integrity of the diffuser 38 due to the vibratory forces and temperature effects that may fatigue the diffuser 38. Accordingly, modifications to the diffuser 38 section as described in further detail in the discussion of FIG. 3 may reduce these effects on the diffuser 38. Such modifications may include manufacturing a desired curvature of the diffuser 38 section, disposing a plurality of the poles 46 between the forward plate 64 and the aft plate 62 of the diffuser 38, a circumferential groove 40 disposed in the inner barrel 48 to receive the aft plate 62, one or more circumferential lap joints 42, a plurality of discrete brackets 44 disposed along the inner barrel 48 and the outer barrel 50 of the diffuser 38 configured to couple the diffuser 38 to the exhaust frame 58, or any combination thereof. The circumferential lap joint 42 and the discrete brackets 44 are configured to reduce movement in certain directions (e.g., circumferentially 66, axially 76, vertically 78, laterally 80) or facilitate movement (e.g., circumferentially 66, axially 76, vertically 78, laterally 80, radially 84), depending on how the circumferential lap joints 42 and the discrete brackets 44 are positioned.

Figure 3:
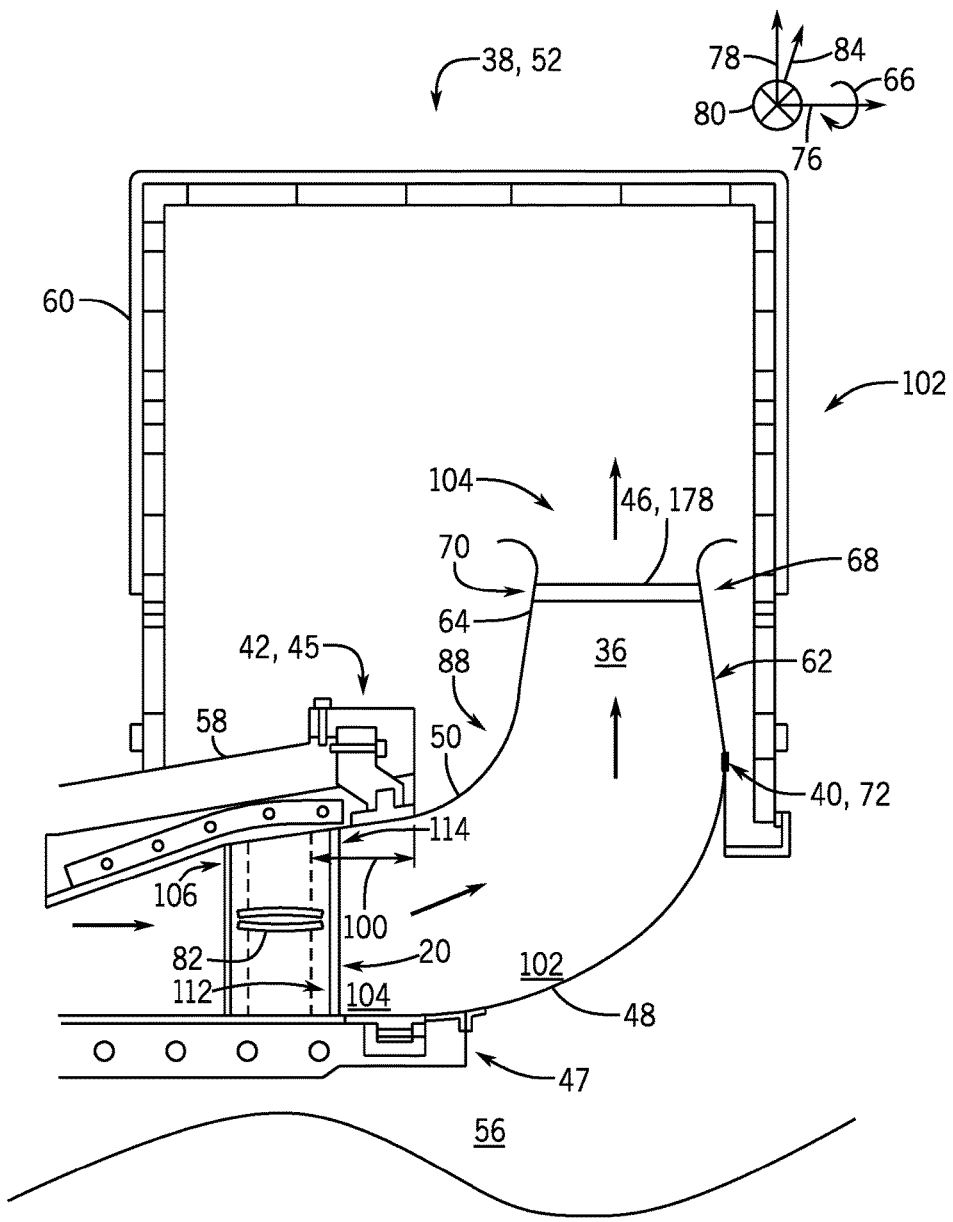
FIG. 3 depicts the modified upper portion of the diffuser.

FIG. 3 depicts the modified upper portion 52 of the diffuser 38 in accordance with the present disclosure. The diffuser 38 section may be manufactured such that the diffuser 38 begins to curve along the inner barrel 48 and the outer barrel 50 of the diffuser 38 at the end nearest the turbine outlet 20. The curvature 88 of the diffuser 38 may provide structural advantages over other diffuser shapes (e.g., more linear shaped diffusers). For example, the continuous curvature 88 of the diffuser 38 may reduce structurally-created stresses by improving aerodynamic properties of the diffuser 38 as compared to approximating a desired curvature with linear plates. As discussed in detail below, the curvature of the diffuser 38 may be formed by a suitable process, such as a spinning process. In some embodiments, each of the inner barrel 48 and the outer barrel 50 of the diffuser 38 is formed from more than one cone. The cone may be an annular sheet formed from a suitable material, as described with respect to FIG. 11. For example, the inner barrel 48 may include 2, 3, or more cone-pieces. The outer barrel 50 may include 2, 3, 4, 5, or more cone-pieces. The cone-pieces may then be subject to the spinning process so that the desired curves of the cone-pieces are formed. The respective cone-pieces are then integrally coupled together (e.g., by welding) to form an integral diffuser 38 section, as described further with respect to FIG. 11. Both the inner barrel 48 and the outer barrel 50 cone-pieces may be formed by the spinning process. The inner barrel 48 and the outer barrel 50 may be separate pieces which may be coupled together via the poles 46.

Other turbine modifications are disposed downstream 104 of the curved portion of the diffuser 38. For example, the plurality of poles 46 may be disposed circumferentially 66 between the forward plate 64 and the aft plate 62 of the diffuser 38. The poles 46 may be coupled to the forward plate 64 and the aft plate 62 to by a plurality of gussets 68 to secure the poles 46 to the forward plate 64 and the aft plate 62. The poles 46 are disposed circumferentially 66 between the forward plate 64 and the aft plate 62. The poles 46 may serve to reduce vibratory behavior between the forward plate 64 and the aft plate 62. The poles 46 may reduce the tendency of undesirable vibration by stiffening the forward plate 64 and the aft plate 62, thereby reducing resonance during operation of the gas turbine 18. The poles 46 may have varying diameters 70 to accommodate flow of the exhaust gases 36. For example, the regions in the diffuser outlet nearest the bottom, inner portion of the diffuser outlet are equipped with poles 46 that have smaller diameters 70 to minimize blockage of the exhaust gases 36.

Also downstream 104 of the curved portion of the diffuser 38 is the circumferential groove 40. The circumferential groove 40 is disposed within inner barrel 48. In some embodiments, the circumferential groove 40 may be disposed on the inner barrel 48 to receive the aft plate 62. The circumferential groove 40 may reduce stresses (e.g., hoop stresses) in the region that may develop due to large temperature changes. As described above, the aft plate 62 is disposed within the exhaust plenum 60 such that the aft plate 62 is exposed to approximately the same operating temperatures as the forward plate 64. The inner barrel 48 hub may be insulated so that portions of the inner barrel 48 are exposed to cooler operating temperatures than the aft plate 62, thereby resulting in a large thermal gradient across the inner barrel 48 and the aft plate 62. As such, the resulting thermal gradient may create stresses in the region via thermal expansion of the inner barrel 48. The circumferential groove 40 may reduce stress by enabling a conical plate 72 of the aft plate 62 to move within the circumferential groove 40. By enabling slight movement in the radial direction 84 between the sections (e.g., the conical plate 72 and the circumferential groove 40), the hoop stresses may be reduced in the region. As described in detail below, the stress reduction from implementing the circumferential groove 40 may reduce hoop stresses by as much as one-half of the stresses experienced by a traditional diffuser without the circumferential groove 40.

The placement of the lap joint 42 and discrete brackets 44 may be partially defined by an attenuation length 100. The attenuation length 100 is defined in part by a plurality of airfoils 82 disposed within the turbine outlet 20. The airfoil 82 is disposed between an outer wall 106 of the turbine outlet 20 and an inner wall 112 of the turbine outlet 20 proximate to a downstream 104 end of the turbine outlet 20. A shorter attenuation length 100 from an air foil 82 to the vertical joint 74 may increase stresses in the vertical joint 74, compared to other configurations where the attenuation length 100 may be longer. The attenuation length 100 may help define the location where the circumferential lap joint 42 is disposed. For example, the lap joint 42 may be disposed at a distance approximately equal to the attenuation length 100 downstream of the air foils 82. In some embodiments, the attenuation length 100 is less than approximately 12 inches. The discrete brackets 44 may reduce movement of the diffuser 38 such that movement in the axial 76, vertical 78, and lateral 80 directions are restricted depending on where the discrete brackets 44 are disposed on the diffuser 38. As described in detail below, the discrete brackets 44 disposed along the inner barrel 48 and the outer barrel 50 may be oriented differently to hold the aft plate 62 and the forward plate 64 of the diffuser 38 in place.

Turning now to the inner barrel 48, the upstream end 102 of the inner barrel 48 of the diffuser 38 section may be coupled to the downstream end 104 of an inner wall 112 of the turbine outlet 20 by an inner circumferential joint 114. The inner circumferential joint 114 may include the plurality of discrete brackets (e.g., brackets 47). The discrete brackets are configured to couple the downstream end 104 of the inner wall 112 of the turbine outlet 20 to the upstream end 102 of the inner barrel 48. The inner discrete brackets 47 are configured to axially 76 support inner barrel 48.

On the inner barrel 48, a secondary flexible seal 101 (e.g., a second circumferential seal) may be disposed in an opening within a secondary flex seal groove 102. The secondary flexible seal 101 may block hot exhaust gases 36 from entering the ventilated bearing tunnel 56. The secondary flexible seal 101 may include one or more plate segments which are circumferentially segmented to make a 360 degree structure that may be bolted at a first end 103. Similar to the flexible seal 92 of the outer barrel 50, the secondary flexible seal 101 may be uncoupled opposite the first end 103 so that the secondary flexible seal 101 may be move freely within the opening of the secondary flex seal groove 102.

Figure 4:
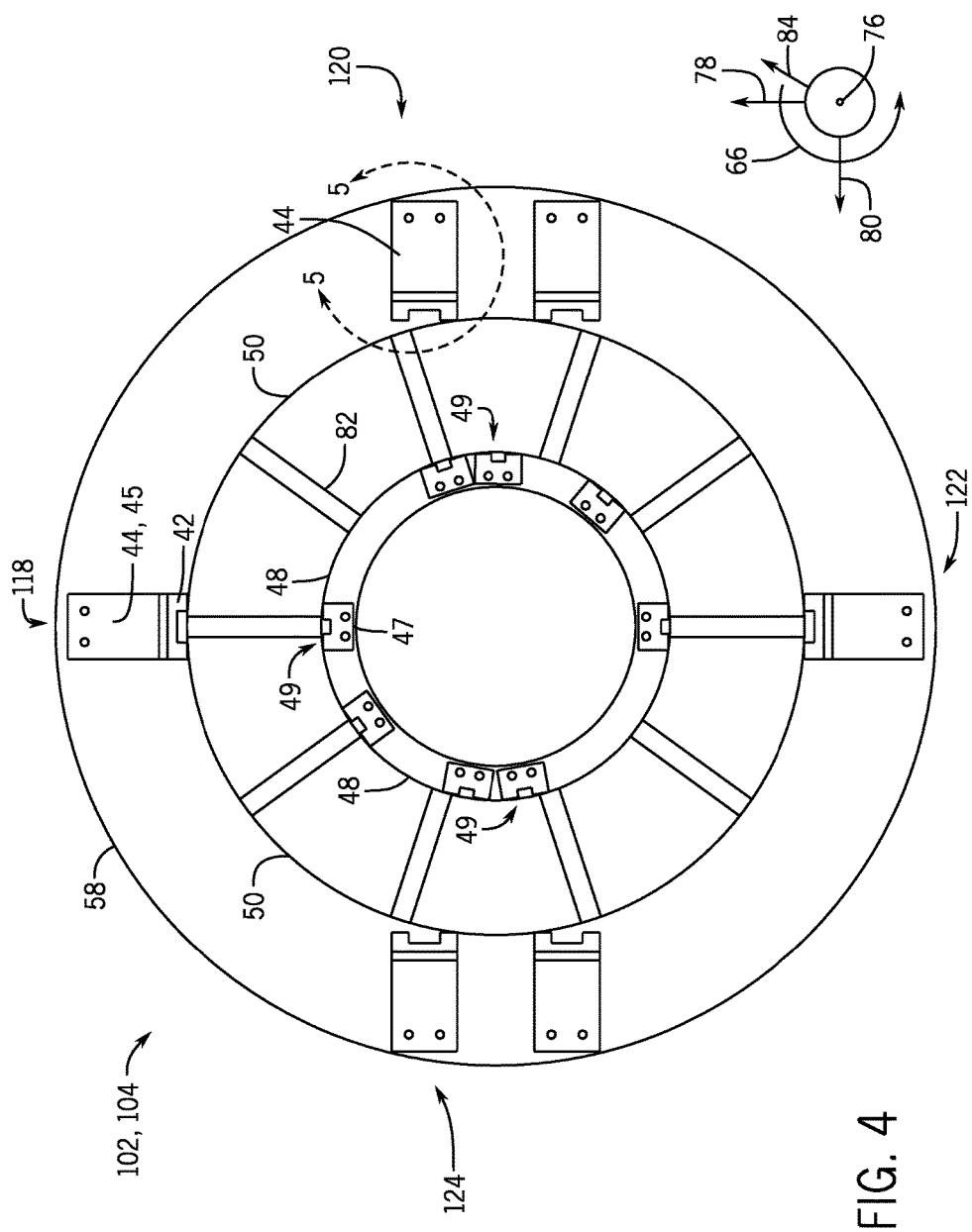
FIG. 4 depicts a cross-sectional view of the diffuser taken through the brackets along line 4-4 of FIG. 2.

FIG. 4 depicts a cross-sectional view of the diffuser 38 taken through the brackets 44 along line 4-4 of FIG. 2. The curvature of the diffuser 38 may begin after (e.g., downstream of) the portion of the diffuser 38 where the lap joint 42 and discrete brackets 44 are disposed. As described above, the lap joint 42 and the discrete brackets 44 may be disposed circumferentially 66 around the outer barrel 50 of the diffuser 38. The discrete brackets 44 may be coupled to the outer barrel 50 and a frame assembly (e.g., exhaust frame 58). The discrete brackets 44 (e.g., outer discrete brackets 45) are configured to support the outer barrel 50 in the axial 76 direction and the circumferential direction 66.

Another set of the discrete brackets 44 may be disposed circumferentially 66 within the inner barrel 48 of the diffuser 38. For example, a subset of the discrete brackets 44 may include a plurality of support brackets (e.g., inner discrete brackets 47). The inner discrete brackets 47 may provide vertical 78 and/or lateral 80 support for the inner barrel 48 relative to the turbine outlet 20. Both the outer discrete brackets 45 and the inner discrete brackets 47 may be disposed about the outer barrel 50 in a rotationally symmetric arrangement.

The inner barrel 48 is exposed to a cooling flow that flows through the ventilated bearing tunnel 56. As such, the inner discrete brackets 47 disposed within the inner barrel 48 may be made of materials that maintain yield strength at lower temperatures (e.g., compared to a higher temperature of the outer barrel 50). The discrete brackets 44 (e.g., the inner discrete brackets 47) may hold the diffuser (e.g., inner barrel 48) in place and reduce movement in the axial direction 76 and/or the lateral direction 80. The inner barrel 48 may include a bolted joint at one end 49 to fix the diffuser 38 sections (e.g., the aft plate 62 of the diffuser and the forward plate 64 of the diffuser) to the turbine outlet 20. The discrete brackets 44 and supporting pairs of relaying blocks (see FIG. 6) enable thermal growth in the radial direction 84.

The discrete brackets 44 may be coupled to the outer barrel 50 and the inner barrel 48 in various locations. In some embodiments, the discrete brackets 44 may be disposed at a 12 o'clock position 118, a 3 o'clock position 120, a 6 o'clock position 122, a 9 o'clock position 124, or any combination thereof. In some embodiments, discrete brackets 44 may be positioned at other positions (e.g., 4 o'clock, 7 o'clock) such that the placement of the discrete brackets 44 remains discrete (e.g., not continuous). Moreover, the position of the discrete brackets 44 may be arranged according to the desired restraint of the outer barrel 50 and the inner barrel 48. In other words, the plurality of outer discrete brackets 45 and the plurality of inner discrete brackets 47 may be circumferentially 66 spaced about the turbine axis 76. The outer discrete brackets 45 are configured to position the outer barrel 50 relative to the outer wall 106 of the turbine outlet 20 to form the circumferential lap joint 42 between the outer wall 106 of the turbine outlet 20 and the outer barrel 50 of the diffuser section 38. The circumferential lap joint 42 is continuous. The movement of the diffuser 38 (e.g., the inner barrel 48 and the outer barrel 50) relative to the turbine outlet 20 may be reduced and/or restrained depending on where the lap joint 42 and discrete bracket 44 are disposed along the outer barrel 50. For example, when the discrete bracket 44 are disposed at the 3 o'clock position 120 and/or the 9 o'clock position 124, the diffuser 38 (e.g., the inner barrel 48 and the outer barrel 50) is restrained in the axial direction 76 and in the vertical direction 78. When the discrete bracket 44 are disposed at the 12 o'clock position 118 and/or the 6 o'clock position 122, the diffuser 38 (e.g., the inner barrel 48 and the outer barrel 50) is restrained in the axial direction 76 and in the lateral direction 80. The discrete brackets 44 may be supported by support components (e.g., a pin) as described further in FIG. 6. The support components may restrict movement in the circumferential direction 66.

Figure 5:
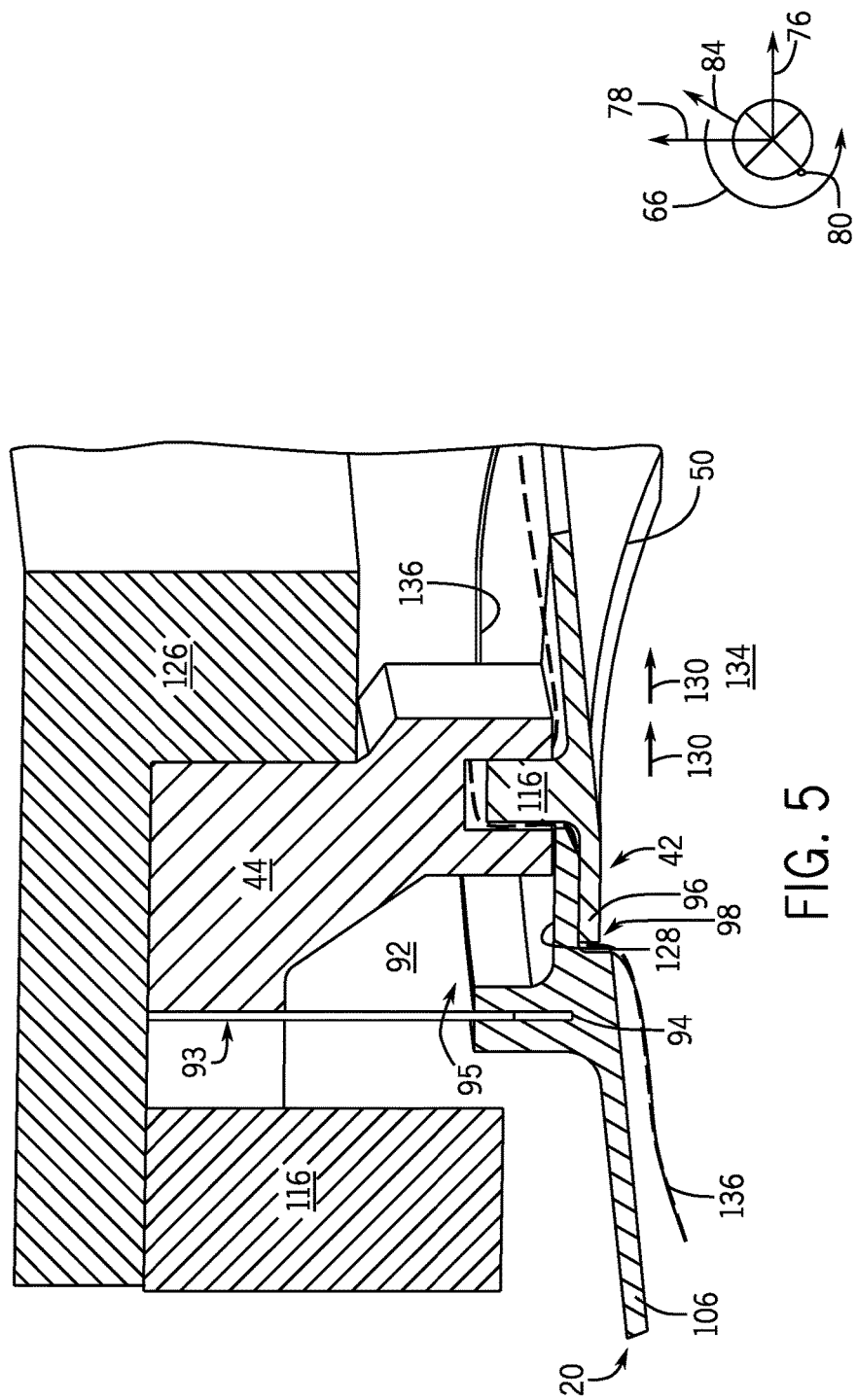
FIG. 5 depicts a perspective view of the lap joint and the discrete bracket, along line 5-5 of FIG. 4.

FIG. 5 depicts a perspective view of the lap joint 42 and the discrete bracket 44, along line 5-5 of FIG. 4. As described above, the discrete brackets 44 may be coupled to the outer barrel 50 and the frame assembly 58 (e.g., diffuser frame 116). The discrete brackets 44 are configured to support the outer barrel 50 in the axial 76 direction, and at least some of the discrete brackets 44 support the outer barrel in the circumferential direction 66.

The circumferential lap joint 42 is disposed between the downstream end 104 of the outer wall 106 of the turbine outlet 20 and the upstream end 102 of the outer barrel 50 of the diffuser 38 section. The circumferential lap joint 42 is configured to facilitate axial 76 movement of the outer barrel 50 relative to the outer wall 106 of the turbine outlet 20, thereby relieving stress in the outer barrel 50. An upstream lip (e.g., outer lip 96) of the outer barrel 50 is disposed radially 84 within a downstream lip (e.g., lip 128) of the outer wall 106 to facilitate ease of movement of the lap joint 42. The stress reduction by use of the upstream lip and the downstream lip is further increased by the use of discrete brackets 44. The outer discrete brackets 45 limit the heat transfer from the exhaust frame 58 to the outer barrel 50. Thus, thermal expansion and contraction is likely to occur at fewer places than with a continuous bracket interface, and the thermal stress is controlled to be primary at the brackets 45. For example, the diffuser 38 section may include the plurality of discrete brackets 44 disposed along the outer barrel 50 (e.g., outer discrete brackets 45) of the diffuser 38 to reduce stress in the vertical joint 74 of the exhaust frame 58.

In some embodiments, a flexible seal 92 may be utilized in the lap joint 42 and discrete bracket 44 assembly. The flexible seal 92 may be disposed proximate to the upstream lip 96 of the outer barrel 50. The flexible seal 92 may be positioned between insulation 126 disposed around the discrete bracket 44 and a flex seal groove 94 of the outer wall 106 of the turbine outlet 20. The flexible seal 92 may include one or more plate segments which are circumferentially segmented to make a 360 degree structure that may be bolted or fastened at a first end 93. The flexible seal 92 may remain uncoupled (e.g., unbolted) opposite the first end 93 so that the flexible seal 92 may move freely within the flex seal groove 94 to seal a clearance space 95 between the flexible seal 92 and an end opposite the bolted end (e.g., first end 93 of flexible seal 92). The flexible seal 92 may discourage a cooling flow from along an outer surface of the turbine outlet 20 (e.g., for clearance control) into the diffuser 38. A slot 98 between the outer wall 106 of the turbine outlet 20 and the outer lip 96 of the outer barrel 50 may facilitate some axial 76 movement of the lap joint 42. The lip 96 may radially 84 interface with the outer lip 128 of the lap joint 42.

As described above, the hot exhaust gases 36 that flow through the turbine 18 and diffuser 38 are received in the exhaust plenum 60. The flexible seal 92 may insulate a cooling flow (e.g., in the exhaust frame) from the hot exhaust gases 36 downstream 104 of the flexible seal 92. A primary flow path may 130 extend from the turbine outlet 20 to a diffuser outlet of the diffuser 38 section through an interior region 134 of the diffuser 38. The interior region 134 is radially 84 within the outer wall 106 and the outer barrel 50 between the outer barrel 50 and the inner barrel 48. The diffuser outlet is configured to direct the exhaust flow 36 to the exhaust plenum 60. A secondary flow path 136 may extend from the exhaust plenum 60 to the interior region 134 through the slot 98 between the downstream lip 128 of the outer wall 106 and the upstream lip 96 of the outer barrel 50. The secondary flow path 136 may extend through the circumferential lap joint 42. In some embodiments, the secondary flow path 136 may include a non-zero portion of the exhaust flow 36 of the interior region 134.

Figure 6:
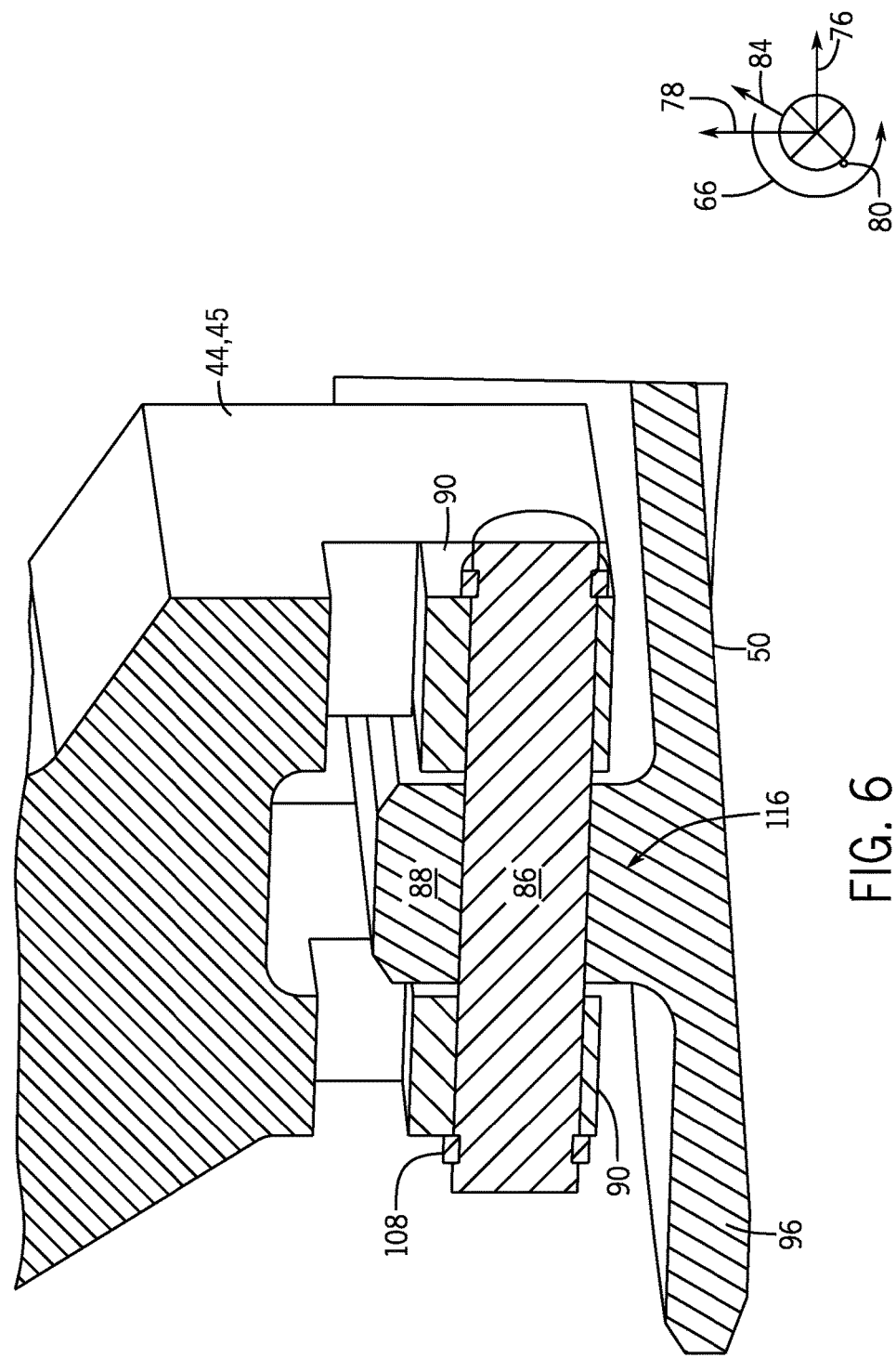
FIG. 6 depicts a perspective view of the lap joint and the discrete bracket, along line 5-5 of FIG. 4.

FIG. 6 depicts a perspective view of the lap joint 42 and the discrete bracket 44, along line 5-5 of FIG. 4. In some embodiments, the discrete brackets 44 may be supported by a pin 86 extending axially 76 through a flange 116 of the outer barrel 50, a flange 116, and a pair of relaying blocks 90. The pin 86 may be disposed through the flange 116 and the relaying blocks 90 to support the discrete bracket 44. The pin 86 is configured to enable movement (e.g., via sliding) in the radial direction 84 of the outer barrel 50 relative to the respective bracket 44. As described above, the plurality of outer discrete brackets 45 includes the plurality of circumferential support brackets 44 (e.g., a subset of the plurality of discrete brackets). Each support bracket 44 of the plurality of discrete outer brackets 45 utilizes the pin 86 to enable movement in the radial direction 84 of the outer barrel 50 relative to the respective support bracket 45. The relaying blocks 90 and the support bracket 47 restrict movement in the circumferential direction 66.

Similar to the discrete outer brackets 44, the plurality of inner discrete brackets 47 may include a plurality of inner circumferential support brackets that each utilize a respective pin 86 to extend axially 76 through respective flanges of the inner wall 112 and the inner barrel 48. The pins 86 are configured to enable radial 84 movement of the inner barrel 48 relative to the respective inner support bracket while restricting circumferential 66 movement.

Figure 7:
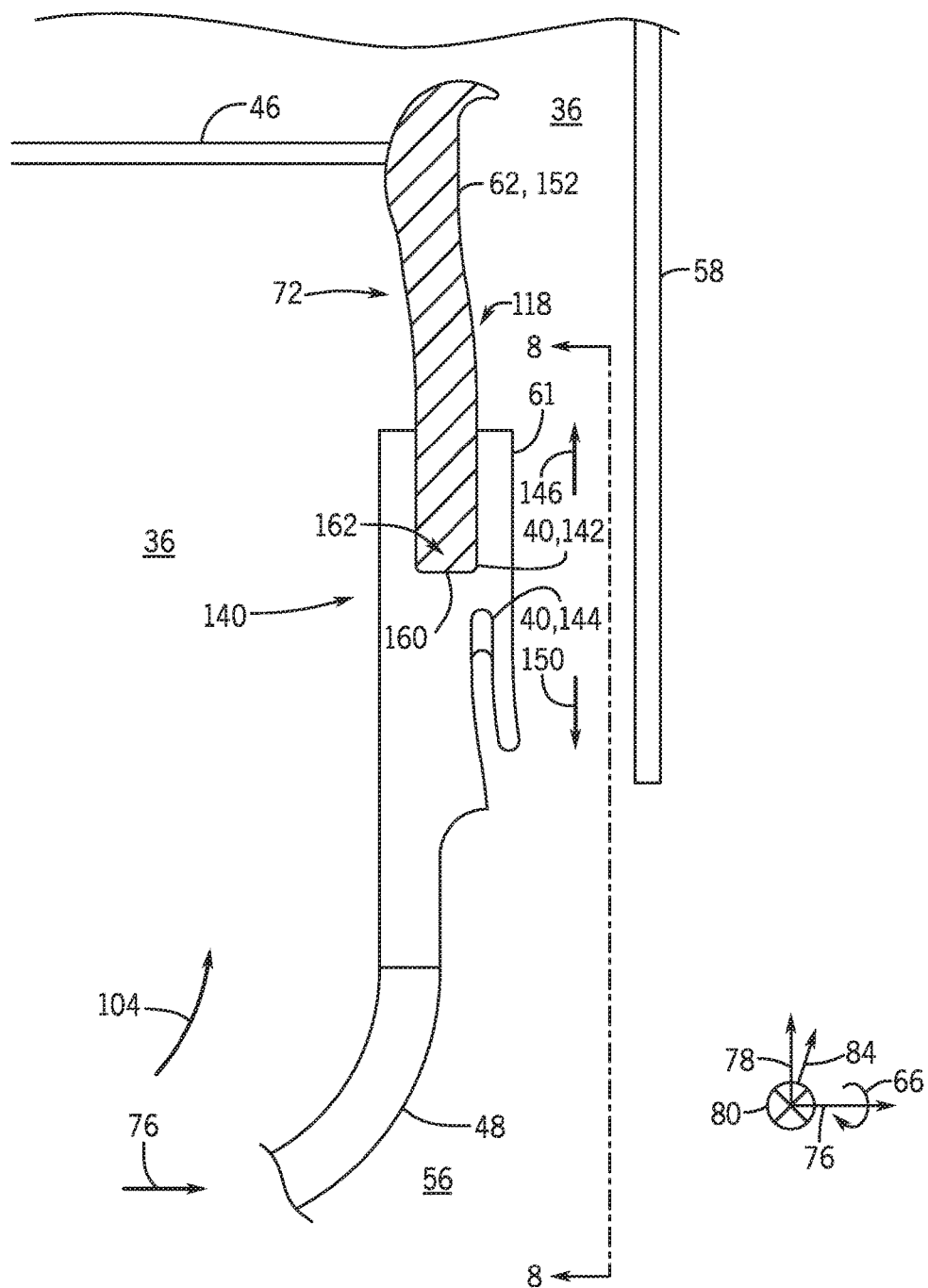
FIG. 7 depicts an axial cross-sectional view of the circumferential groove within the inner barrel of the diffuser of FIGS. 2 and 3.

FIG. 7 depicts an axial cross-sectional view of the circumferential groove 40 within the inner barrel 48 of the diffuser 38 of FIGS. 2 and 3. The aft plate 62 interfaces with the inner barrel 48 of the diffuser 38 at the circumferential groove 40. As described above, the inner barrel 48 and the outer barrel 50 are disposed about the turbine axis 76. The aft plate 62 is disposed at least partially within the exhaust plenum 60 and is disposed downstream 104 of the inner barrel 48.

The circumferential groove 40 may reduce stresses (e.g., hoop stresses) in the region that may form due to large thermal gradients. The aft plate 62 and the forward plate 64 are disposed at least partially within the exhaust plenum 60. The hub of the inner barrel 48 is insulated such that the inner barrel 48 hub is exposed to cooler operating temperatures than the aft plate 62, thereby resulting in different temperatures at the aft plate 62 and the inner barrel 48 hub. The difference in temperatures between the aft plate 62 and the inner barrel 48 hub results in a large thermal gradient across the hub of the inner barrel 48 and the aft plate 62. The resulting thermal gradient creates stresses in the region due to thermal expansion/contraction. The hoop stresses may be reduced in the region by enabling slight movement (i.e., upstream movement, downstream movement) between the sections (e.g., the conical plate 72 and the circumferential groove 40). The stress reduction from implementing the circumferential groove 40 may reduce hoop stresses by as much as one-half. For example, the stresses in the aft plate 62 region may be reduced from approximately 413 MPa when the circumferential groove 40 is not present in the inner barrel 48 to about 207 MPa when the circumferential groove 40 is present in the inner barrel 48.

A seal interface 140 disposed at a downstream 104 end of the inner barrel 48 and the aft plate 62 includes the circumferential groove 40. In some embodiments, the seal interface 140 is mechanically coupled (e.g., welded, fused, brazed, bolted, fastened) to the downstream end 104 of the inner barrel 48. In some embodiments, the seal interface 140 is formed at the downstream end of the inner barrel 48. The seal interface 140 may include a first circumferential groove 142 and a second circumferential groove 144. The first circumferential groove 142 is configured to receive the aft plate 62. As such, the first circumferential groove 142 opens in a first direction 146 (e.g., downstream 104) away from the turbine axis 76. The secondary flexible seal 101 is configured to isolate the exhaust plenum 60 from the ventilated bearing tunnel 56. The second circumferential groove 144 opens in a second direction 150 (e.g., upstream) towards the turbine axis 76.

The first circumferential groove 142 and the second circumferential groove 144 enable some upstream and downstream movement of the inner barrel 48 relative to the aft plate 62, resulting in reduced stresses in the region. In the illustrated embodiment, the aft plate 62 is configured to interface with a root 160 of the first circumferential groove 142 at the 12 o'clock position 118 of the seal interface 140. The seal interface 140 reduces space between the first circumferential groove 142 and the root 160 so that no gap at the 12 o'clock position 118 is formed. The seal interface 140 also contributes to stress reduction in the poles 46 by enabling the seal interface of the inner barrel 48 to support some of the vertical load of the aft plate 62. The aft plate 62 may be offset from the root 160 of the first circumferential groove 142 at the 6 o'clock position 122 (e.g., opposite of the 12 o'clock position 118) of the seal interface 140.

The aft plate 62 may be made up of a plurality of circumferential segments 152 (e.g., aft plate segments, conical plate 72). In some embodiments, one or more of the plurality of circumferential segments 152 may include a stress relieving feature 154 disposed along a joint 156 between the circumferential segments 152 of the aft plate 62, as described with respect to FIG. 10. The stress relieving features 154 may be concentrated towards an end portion of the circumferential segments 152 (e.g., aft plate segments) proximate to the seal interface 140.

Figure 8:
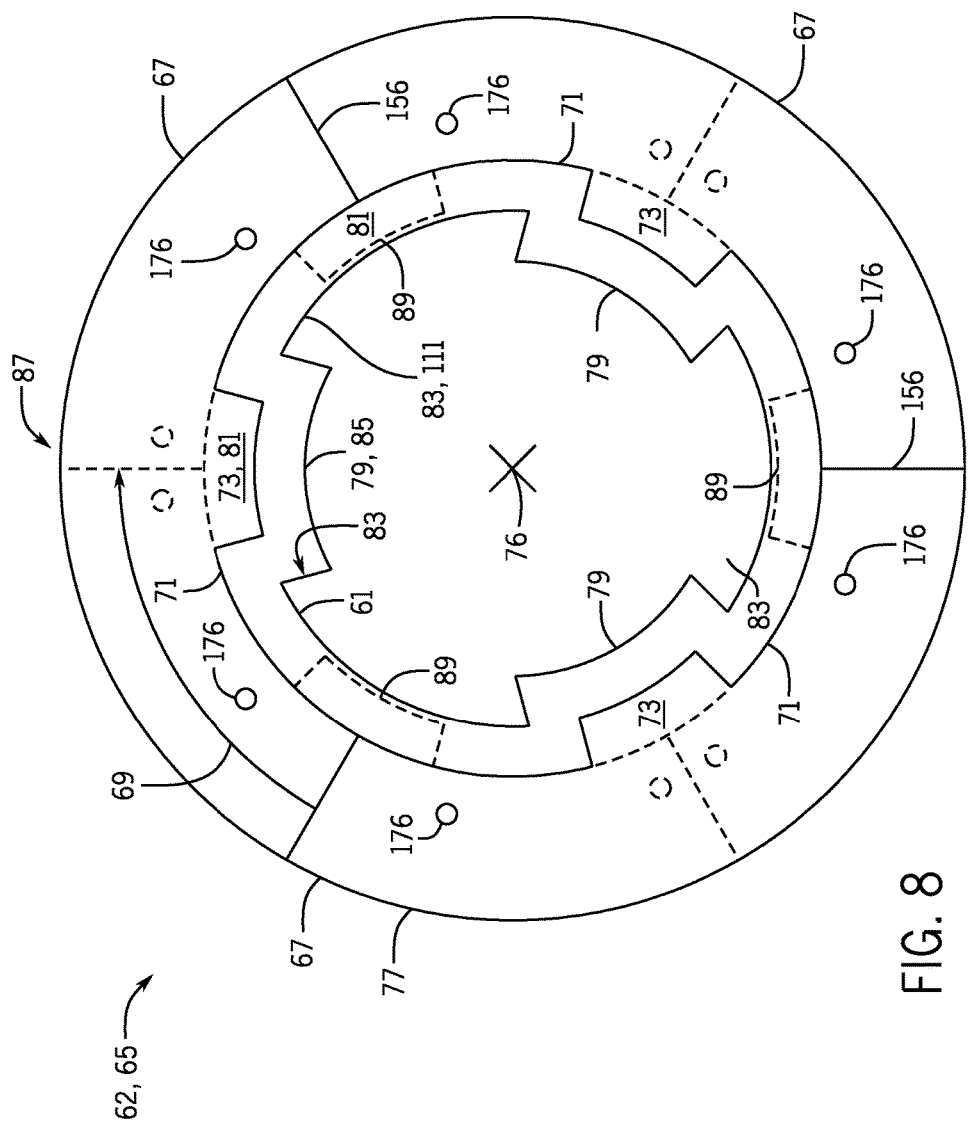
FIG. 8 depicts an axial view of an embodiment of the aft plate assembly taken along line 8-8 of the diffuser of FIG. 7.

In one embodiment, the aft plate 62 includes an aft plate assembly 65, which may be made up of a plurality of aft plate segments 67 (see FIG. 8). The aft plate assembly 65 may include 2, 3, 4, 5, 6, or more aft plate segments 67. It may be appreciated that reducing the number of aft plate segments 67 contributes to reducing the assembly time in the region by reducing the components associated with the aft plate assembly 65. The aft plate assembly 65 may be an annular aft plate assembly that extends circumferentially 66 about an axis 76 of the inner barrel. The circumferential groove 40 also extends circumferentially 66 about the axis 76 of the inner barrel. The aft plate segments 67 may be joined together in a suitable manner, such as by welding, brazing, fusing, fastening, or any combination thereof. In the illustrated embodiment, the aft plate assembly 65 reduces space between the first circumferential groove 142 and the root 160 so that no gap at the 12 o'clock position 118 is formed. As described further with reference to FIGS. 8 and 9, the aft plate segments 67 may include a plurality of notches 71 and a plurality of ridges 73. The plurality of ridges 73 may be disposed on a radially interior surface 75 of the aft plate 62. The notches 71 and ridges 73 may allow a reduction in thermal mass of the aft plate assembly 65. Reducing the thermal mass of the aft plate assembly 65 may contribute to reduced thermal stresses in the region and/or more uniform heat transfer among components of the aft plate assembly 65 when the turbine is operating.

FIG. 8 depicts an axial view of an embodiment of the aft plate assembly 65 taken along line 8-8 of the diffuser 38 of FIG. 7. In the illustrated embodiment, the aft plate assembly 65 includes three aft plate segments 67. As described above, the aft plate assembly 65 may include any number of aft plate segments 67, including 2, 3, 4, 5, 6, or more aft plate segments 67 to form a 360 degree structure (e.g., annular aft plate assembly). The segments 67 may be joined together by any suitable joining process, such as welding or fusing along joints 156. In some embodiments, each aft plate segment 67 may include one or more notches 71 (e.g., a receiving portion) and one or more ridge 73 (e.g., an inserted portion). The notches 71 and the ridges 73 are disposed on a radially interior surface 75 of the aft plate 62. The aft plate assembly 65 includes a downstream lip 61 of the inner barrel 48. The downstream lip 61 of the aft plate assembly 65 has a plurality of notches 79 and a plurality of ridges 83. In the illustrated embodiment, the radially interior surface 75 of the aft plate 62 may be inserted axially 76 into the circumferential groove 40 such that the ridges 73 of the aft plate 62 pass axially through the notches 79 of the downstream lip 61, and the ridges 83 of the downstream lip 61 pass axially through the notches 71 of the interior surface 75 of the aft plate 62. Inserting the aft plate 62 into the circumferential groove 40 may include inserting a first ridge 81 of the aft plate 62 into a first notch 85 of the inner barrel 48. When the first ridge 81 is inserted into the first notch 85, the aft plate 62 is disposed in a first circumferential orientation 87 (e.g., a first position) relative to the inner barrel 48. That is, the aft plate assembly 65 is in the first circumferential orientation 87. The aft plate 62 may be turned (e.g., rotated in a circumferential direction 66) to a second circumferential orientation 89 (e.g., a second position) such that the first ridge 81 axially overlaps with a second ridge 111 of the downstream lip 61.

The aft plate 62 of the aft plate assembly 65 may be turned or rotated approximately 15 to 60 degrees, 30 to 45 degrees, 35 to 40 degrees, or any subranges therebetween. When the aft plate 62 is turned, indicated by arrow 69, to the second circumferential orientation 89 relative to the inner barrel 48, the aft plate assembly 65 is configured to retain the aft plate 62 axially 76 in the circumferential groove 40. The first circumferential orientation 87 is circumferentially offset about the axis 76 of the inner barrel 48 from the second circumferential orientation 89 by less than approximately 60 degrees. In some embodiments, the first circumferential orientation 87 is circumferentially offset about the axis of the inner barrel 76 from the second circumferential orientation 89 by less than approximately 30 degrees. A method of forming the aft plate assembly 65 by inserting the plurality of ridges 73 of the aft plate 62 through the plurality of notches 71 of the downstream lip 61 may be further understood with reference to FIG. 12. It may be appreciated that the aft plate assembly 65 may enable leakage of the exhaust gases through the connection between the aft plate 62 and the inner barrel 48. The leakage of exhaust gases through the aft plate assembly 65 may reduce stresses on the aft plate 62, the inner barrel 48, or some combination thereof. The leakage may be reduced when the ridges 73 are turned to the second circumferential orientation 89 such that the ridges 73 of the aft plate 62 axially overlap with the ridges 83 of the inner barrel 48. In one embodiment, the leakage of the exhaust gases may be 0.01 to 3 percent, 0.05 to 2 percent, 1 to 1.5 percent of the exhaust flow gases, or any subranges therebetween.

Figure 9:
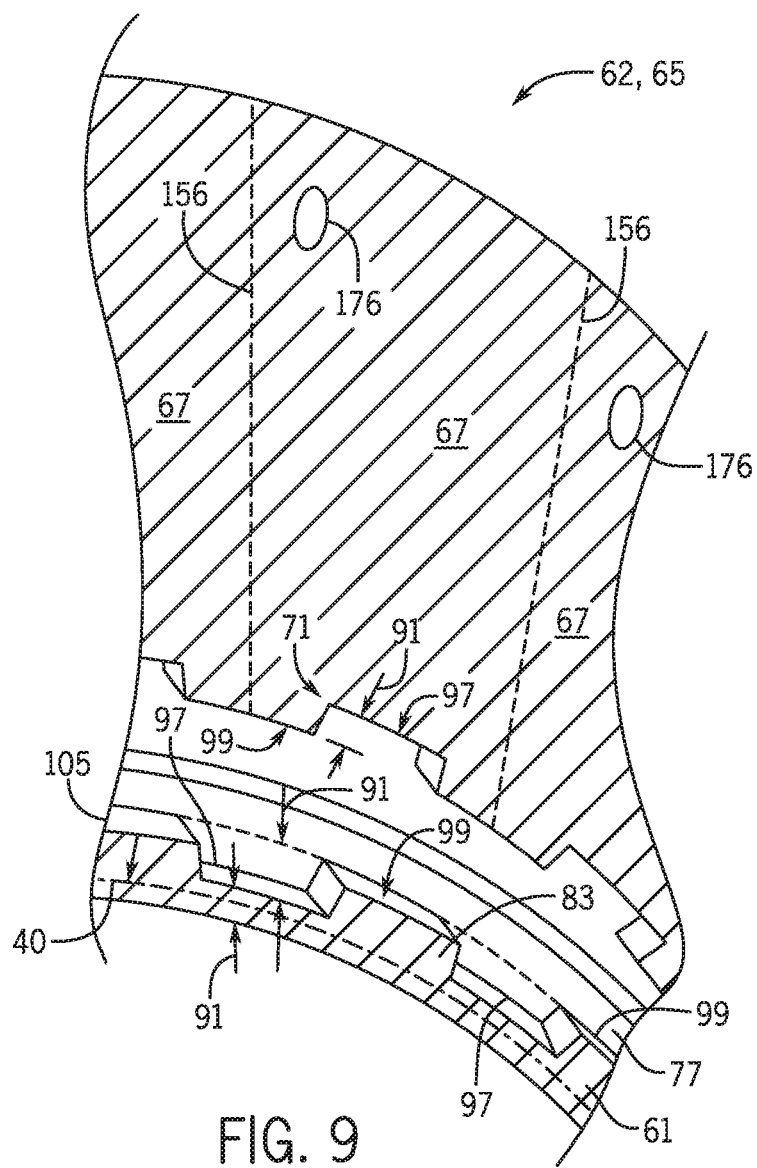
FIG. 9 depicts a cutaway view of the aft plate assembly of FIG. 8.

FIG. 9 depicts a partial cross-sectional view of the aft plate assembly. As illustrated and as describe above, the aft plate assembly 65 includes the plurality of apertures 176 to receive the plurality of poles 46. One or more apertures 176 may be disposed in the aft plate segments 67. The aft plate segments 67 may be joined together via fusing, brazing, welding, or any other suitable process. The aft plate segments 67 may form joints 156 (e.g., a welded joint, a brazed joint, a fused joint, a fastened joint) where the aft plate segments 67 are joined together. As illustrated, the aft plate segment 67 includes a radial ridge height 91 between a root 97 of a respective notch 71 and a crest 99 of the adjacent ridge 73. Additionally, the downstream lip 61 of the inner barrel 48 may have substantially the same or greater radial ridge height 91 between the root 97 of a respective notch 79 and the crest 99 of the adjacent ridge 83. In one embodiment, the radial height 91 is less than a radial height 105 of the upstream lip 77 of the circumferential groove 40.

Figure 10:
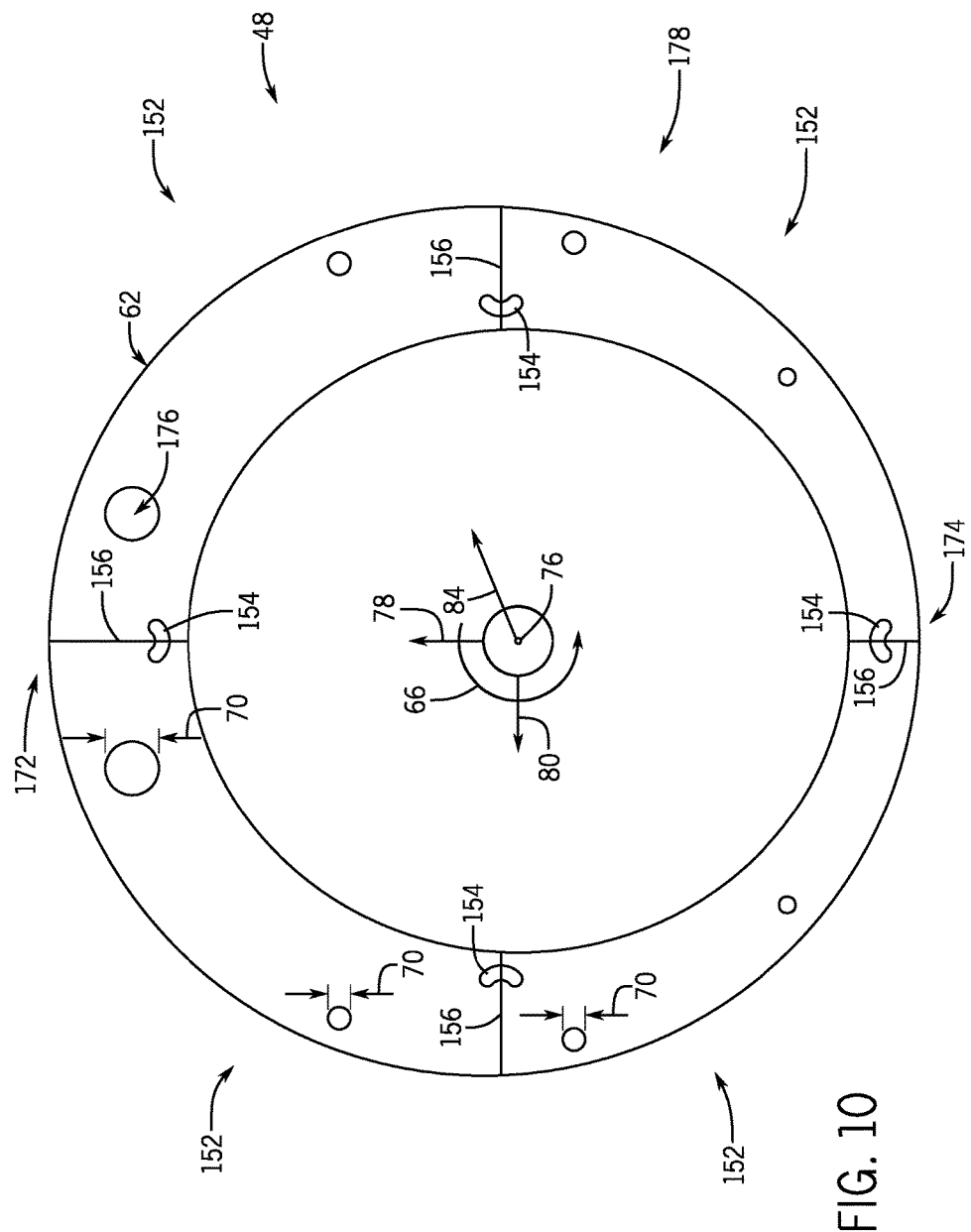
FIG. 10 depicts an axial view of an embodiment of the aft plate of the inner barrel taken along line 8-8 of the diffuser of FIG. 7.

FIG. 10 depicts an axial view an embodiment of the aft plate 62 of the inner barrel 48 taken along line 8-8 of the diffuser 38 of FIG. 7. In the illustrated embodiment, the downstream end 104 of the aft plate 62 coupled to the downstream end 104 of the forward plate 64 via the plurality of poles 46. As described above, the inner barrel 48 and the outer barrel 50 are disposed around the turbine axis 76. As such, the plurality of poles 46 may be circumferentially 66 spaced about the turbine axis 76.

As described above, the aft plate 62 may be made up of the plurality of circumferential segments 152 (e.g., aft plate segments, conical plate 72). The plurality of circumferential segments 152 may include the plurality of stress relieving features 154 disposed along the plurality of joints 156 between the circumferential segments 152 of the aft plate 62. The plurality of stress relieving features 154 may be any suitable shape to accomplish the stress relief including circular, heart-shaped, bean-shaped, or any combination thereof.

In some embodiments, the poles 46 have varying pole diameters 70. The pole diameter 70 is based in part on the circumferential 66 location of the pole 46 location along the diffuser 38. For example, the diameter 70 of the poles 46 nearest a top portion 172 of the aft plate 62 and the forward plate 64 have a larger diameter 70 than the poles 46 nearest a bottom portion 174 of the aft plate 62 and the forward plate 64. Accordingly, a plurality of apertures 176 correspond to the plurality of poles 46 disposed within the diffuser 38. The apertures 176 may vary based in part on the circumferential 66 location of the apertures 176 to couple to outer aft plate 62 and the inner aft plate 63 via the plurality of poles.

In the illustrated embodiment, a first set 178 (see FIG. 2) of poles 46 disposed at circumferential 66 locations within the bottom portion 174 of the diffuser 38 section may have a non-uniform axial cross-section. For example, the first set 178 of poles 46 may have an ovular, elliptical, spherical, or other non-uniform portion of the axial cross-section. The non-uniform portion of the poles 46 within the bottom portion 174 of the diffuser 38 section may enable the poles 46 to exhibit more elasticity (e.g., in the radial direction 84) than circular poles 46, which may reduce stresses in the bottom portion 174. In some embodiments, the poles diameters 70 are smaller to reduce aerodynamic effects on the flow of the exhaust gases 36. As such, smaller pole diameters 70 may be beneficial by reducing blockage of the exhaust flow path 36.

Figure 11:
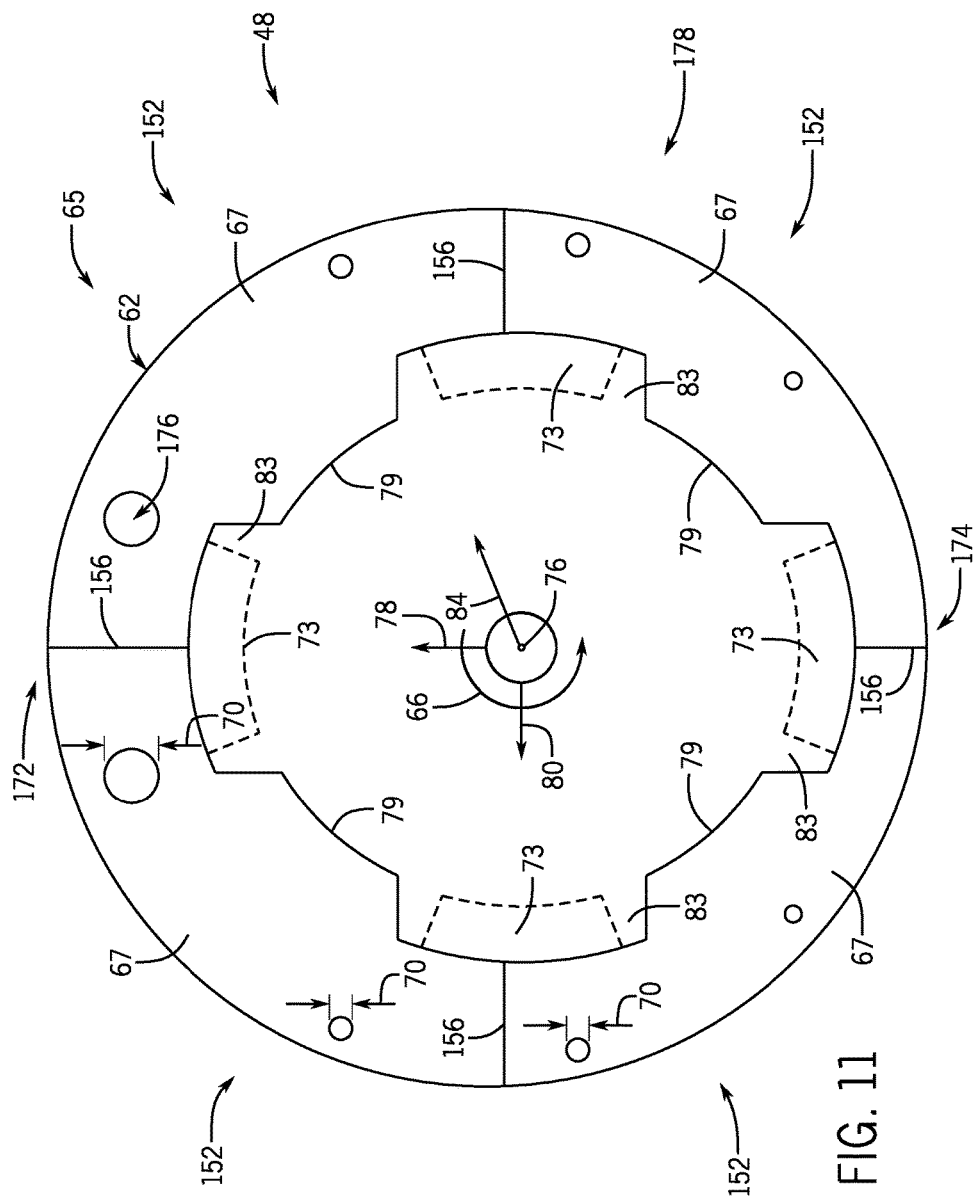
FIG. 11 depicts an axial view of an embodiment of the aft plate assembly of the inner barrel taken along line 8-8 of the diffuser of FIG. 7.

FIG. 11 depicts an axial view of an embodiment of the aft plate assembly 65 of the inner barrel 48 taken along line 8-8 of the diffuser 38 of FIG. 7. As described above, the aft plate assembly 65 includes a plurality of aft plate segments 67. The aft plate assembly 65 illustrated in FIG. 11 is in the second circumferential orientation 89 such that the ridges 73 of the aft plate 62 are axially retained by the ridges 83 of the downstream lip 61 of the inner barrel 48, as described above. The aft plate segments 67 include apertures 176 to receive the poles 46 to couple the downstream end 104 of the aft plate 62 to the downstream end 104 of the forward plate 64. The poles 46 may be coupled to the aft plate segments 67 as described above with reference to FIG. 10. That is, the first set 178 (see FIG. 2) of poles 46 disposed at circumferential locations within the bottom portion 174 of the diffuser 38 section may have a non-uniform axial cross-section. In the illustrated embodiment, the aft plate segments 67 do not include the stress relieving features 154 as shown in the aft plate 62 described with reference to FIG. 10 above.

Figure 12:
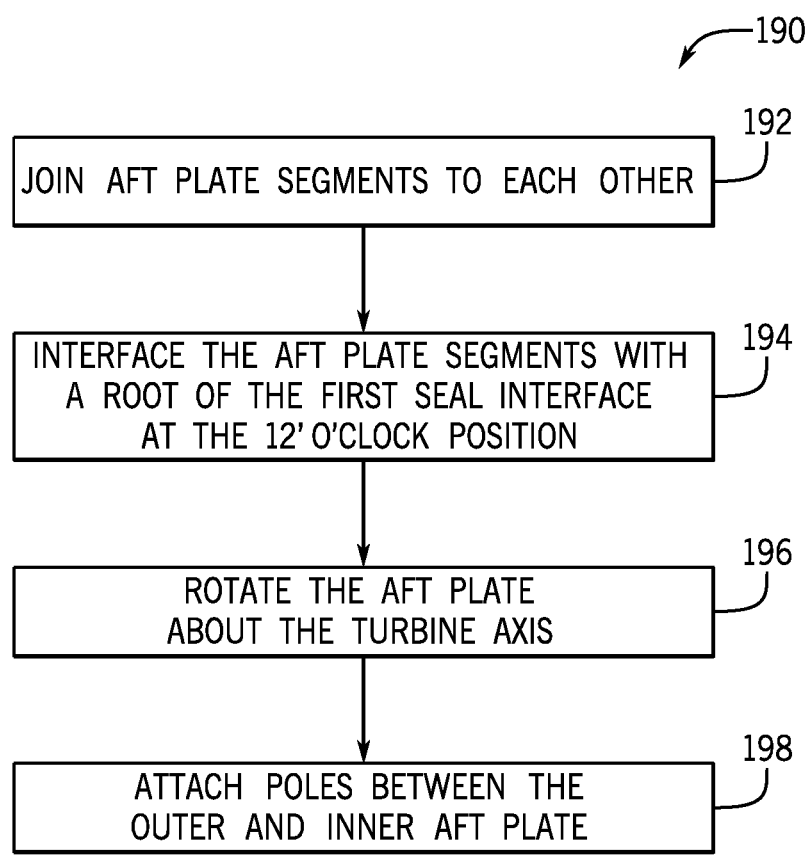
FIG. 12 describes a method of forming the aft plates segments according to an embodiment of the present disclosure.

FIG. 12 describes a method of forming the aft plate assembly 65 according to an embodiment of the present disclosure. The aft plate assembly 65 may be formed by a method 190. The method 190 may include joining (block 192) the plurality of aft plate segments 67 in the radial direction 84 to each other by welding, fusing, brazing, bolting, or fastening, or any combination thereof. The joined aft plate segments 67 form the aft plate 62. The method 190 may include interfacing (block 194) the aft plate 62 with the 160 root of the first seal interface 162 the 12 o'clock position 118. As described above, the aft plate 62 may be inserted axially through the downstream lip 61 of the inner barrel 48 via complementary notches and ridges so that the aft plate 62 is disposed within the circumferential groove of the inner barrel 48. That is, in a first circumferential position 87, ridges 73 of the aft plate 62 may be inserted axially through notches 79 of the downstream lip 61, and notches 71 of the aft plate 62 may axially receive ridges 83 of the downstream lip 61. In some embodiments, the 6 o'clock position 122 of the aft plate 62 is offset (e.g., spaced apart radially) from the root 160. The method 190 may include rotating (block 196) the aft plate 62 about the axis of the inner barrel 48. As described above, the aft plate assembly 65 may be rotated from the first circumferential position 87 to a second circumferential position 89. In some embodiments, the aft plate 62 is rotated approximately 15 to 45 degrees relative to the inner barrel 48. The method 190 may further include attaching (block 198) the poles 46 between the downstream end 104 of the aft plate 62 coupled to the downstream end 104 of the forward plate 64 via the plurality of poles 46.

Returning now to FIG. 10, the poles 46 disposed within the top portion 172 of the diffuser 38 may be configured to support the load (e.g., weight) of the diffuser 38. For example, the poles 46 disposed within the top portion 172 of the diffuser 38 may be utilized to lift the diffuser 38. In some embodiments, the poles 46 disposed within the top portion 172 of the diffuser 38 section may be coupled to a hoist, lift, crane, or other suitable lifting machine to move the assembled diffuser 38 with aft plates 62 to a suitable location (e.g., move for installation, removal, service, repair).

Each of the plurality of poles 46 includes a pole axis. In some embodiments, the plurality of poles 46 may be substantially parallel to a common pole axis (e.g., the turbine axis 76). It should be appreciated the plurality of poles 46 do not support a plurality of turning vanes. Moreover, in some embodiments, no turning vanes are disposed in the diffuser 38. Poles are positioned at or near the downstream end of the diffuser 38 to reduce vibration and to facilitate installation.

Figure 13:
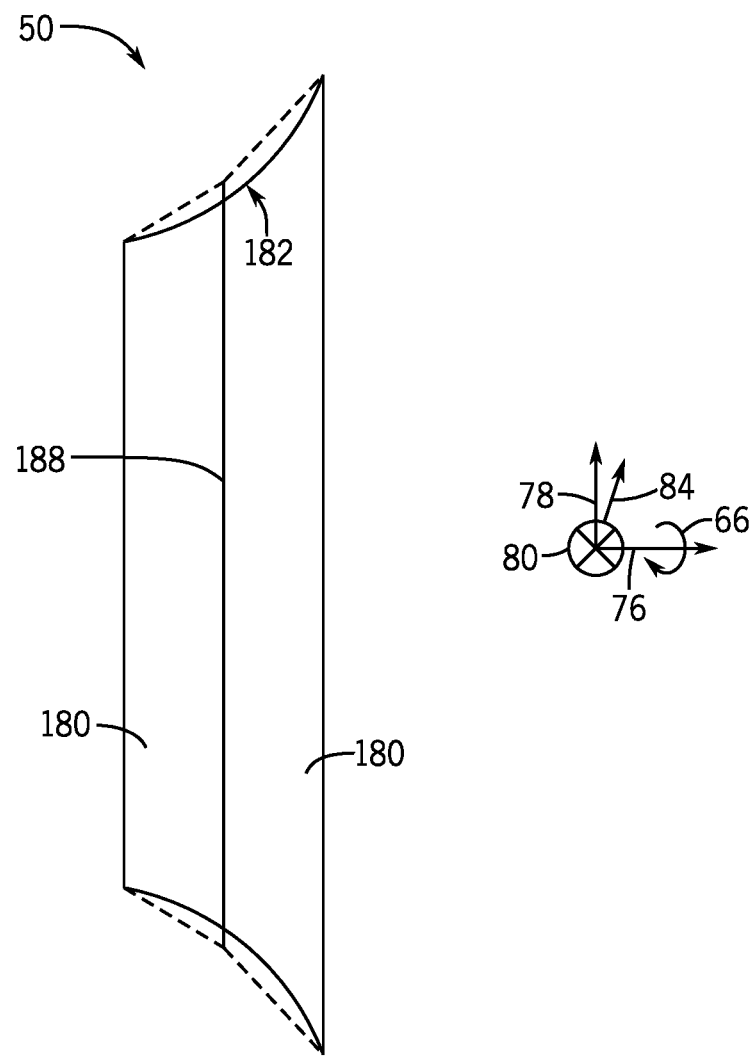
FIG. 13 depicts a side view of an embodiment of the outer barrel.
Figure 14:
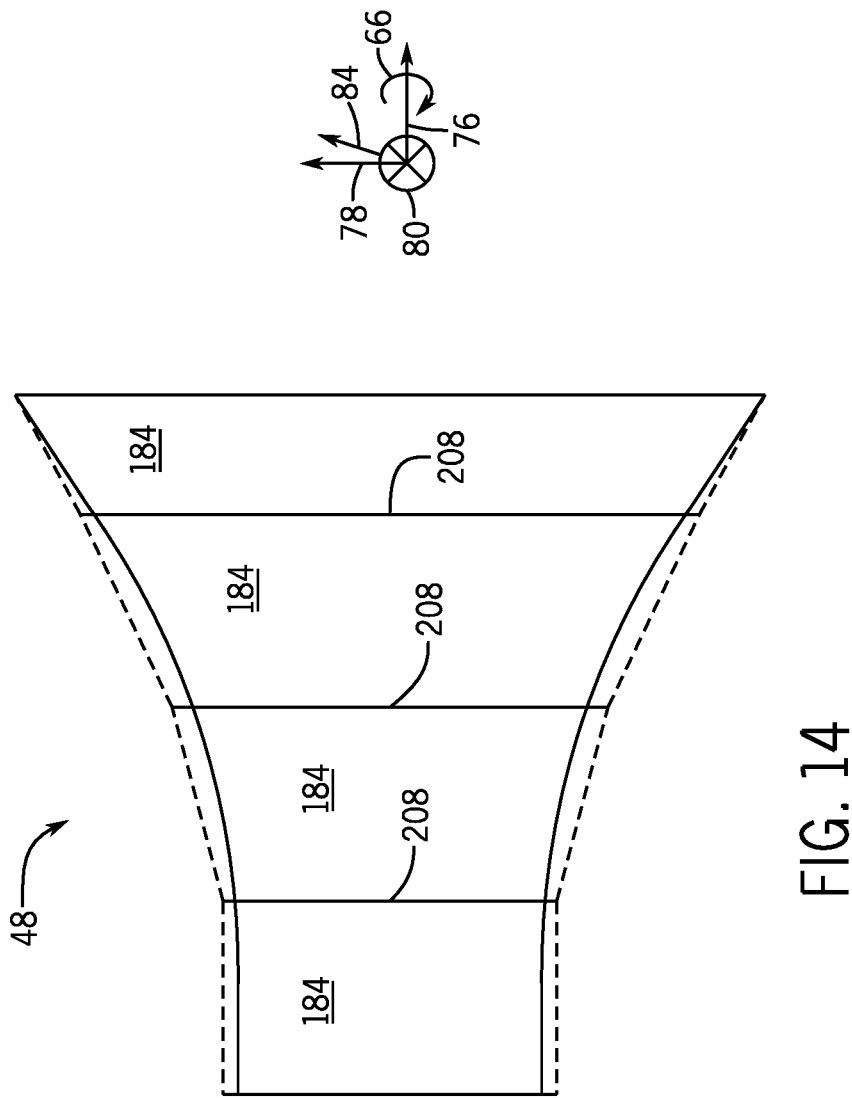
FIG. 14 depicts a side view of the inner barrel.

FIGS. 13 and 14 depict a side view of the inner barrel 48 and the outer barrel 50 of the diffuser 38. As illustrated within the solid lines, the inner barrel 48 and the outer barrel 50 are curved to reduce stresses in the diffuser 38. The curvature 88 of the inner barrel 48 and the outer barrel 50 begins downstream of the turbine section 18. Portions of the inner barrel 48 and the outer barrel 50 are disposed within the exhaust plenum 60. FIG. 13 depicts a side view of an embodiment of the outer barrel 50. The outer barrel 50 includes a first plurality of axial segments 180 disposed downstream of the outer barrel 50. In the illustrated embodiment, the outer barrel 50 includes two segments (e.g., axial segments). Though two axial segments are shown, it will be appreciated that the outer barrel may include three, four, or more axial segments. The first plurality of outer barrel segments 180 are joined together in the axial direction and form an outer barrel interface 188 between each of the outer barrel segments 180. As described above, joining may include welding, brazing, fusing, fastening, or any combination thereof. The first plurality of outer barrel segments 180 includes a first continuous curve 182 that curves away from the turbine axis 76 (e.g., from the upstream end of the outer barrel 50 to the outer aft plate 62).

FIG. 14 depicts a side view of the inner barrel 48. In the illustrated embodiment, the inner barrel 48 includes four segments (e.g., axial segments). The inner barrel 48 includes a second plurality of axial segments 184 disposed between the upstream end of the inner barrel 48 and the seal interface 140. Though four axial segments are shown, it will be appreciated that the inner barrel 48 may include three, four, five, six, or more axial segments 184. The second plurality of axial segments 184 are joined together in the axial direction and form an inner barrel interface 208 between each of the inner barrel segments 184. As described above, joining may include welding, brazing, fusing, fastening, or any combination thereof. The second plurality of axial segments 184 (e.g., inner barrel segments) includes a second continuous curve 186 that curves away from the turbine axis 76 (e.g., from the upstream end of the inner barrel 48 to the seal interface 140). As will be appreciated, the second plurality of axial segments 184 (e.g., of the inner barrel 48) is greater than the first plurality of axial segments of the outer barrel 50 due to the arrangement of the inner barrel 48 and the outer barrel 50. The curvature of the both the inner barrel 48 and the outer barrel 50 may be further understood with respect to the discussion of the spinning process, as described in FIG. 15.

Figure 15:
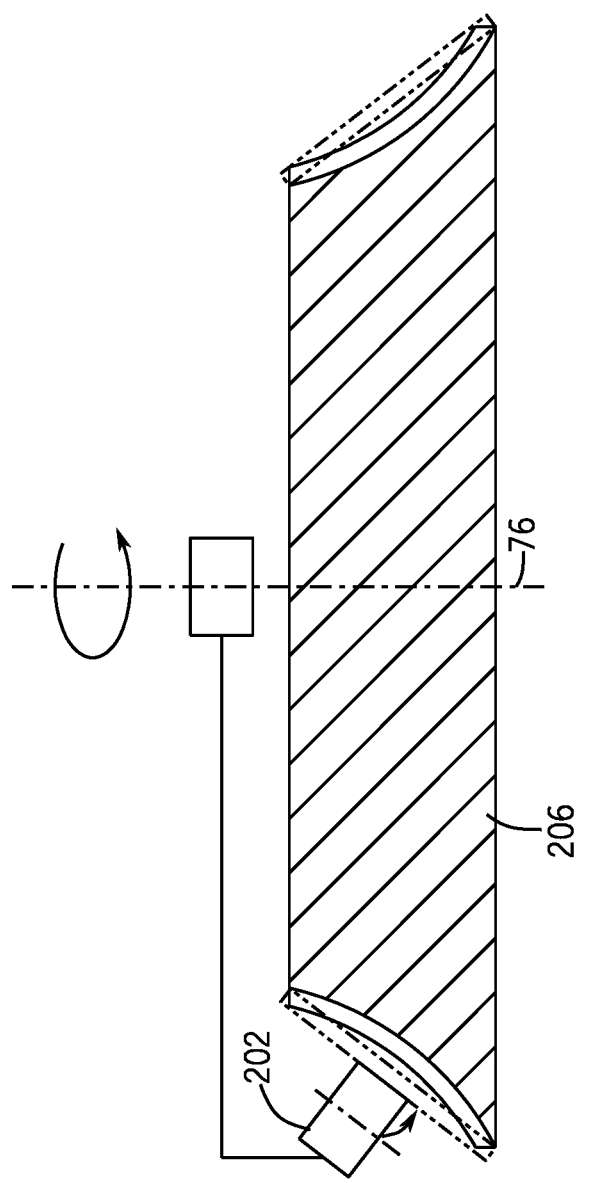
FIG. 15 illustrates exemplary equipment used to machine the inner barrel and the outer barrel into the desired continuous curvature, as described in FIGS. 13 and 14.

FIG. 15 illustrates exemplary equipment used to machine the inner barrel 48 and the outer barrel 50 into the desired continuous curvature, as described in FIGS. 13-14. The first and the second continuous curves 182, 186 (e.g., of the outer barrel, of the inner barrel) may be created via a suitable cold machining process, such as a spinning process. The spinning process involves molding a suitable material 204 (e.g., stainless steel) for the inner barrel 48 and the outer barrel 50 into the desired shape by placing the material over a mold 206. The material 204 is then molded into the desired shape by utilizing a roller 202 to press the material into the mold 206, thereby gradually forming the desired mold shape.

The spinning process described above enables the desired curvature of diffuser 38 to provide required turbine engine performance (e.g., through reduced stresses). To reduce residual stresses encountered via the spinning process, the inner and outer barrels 48, 50 may be formed from multiple axial segments (e.g., first plurality of axial segments 180, second plurality of axial segments 184). Utilizing more axial segments to create the inner barrel 48 and the outer barrel 50 may require less deformation of each segment to create the desired shape of the inner barrel 48 and the outer barrel 50, thereby reducing the amount of residual stresses that remain in the completed diffuser 38.

Once the axial segments (e.g., first plurality of axial segments 180, second plurality of axial segments 184) are formed, the axial segments may be joined together. The axial segments may be cut from the suitable material to ensure the axial segments (e.g., first plurality of axial segments 180, second plurality of axial segments 184) have excess material so that the segments can be adequately joined together. The axial segments may be axially joined together by welding, brazing, fusing, bolting, fastening, or any combination thereof.

Figure 16:
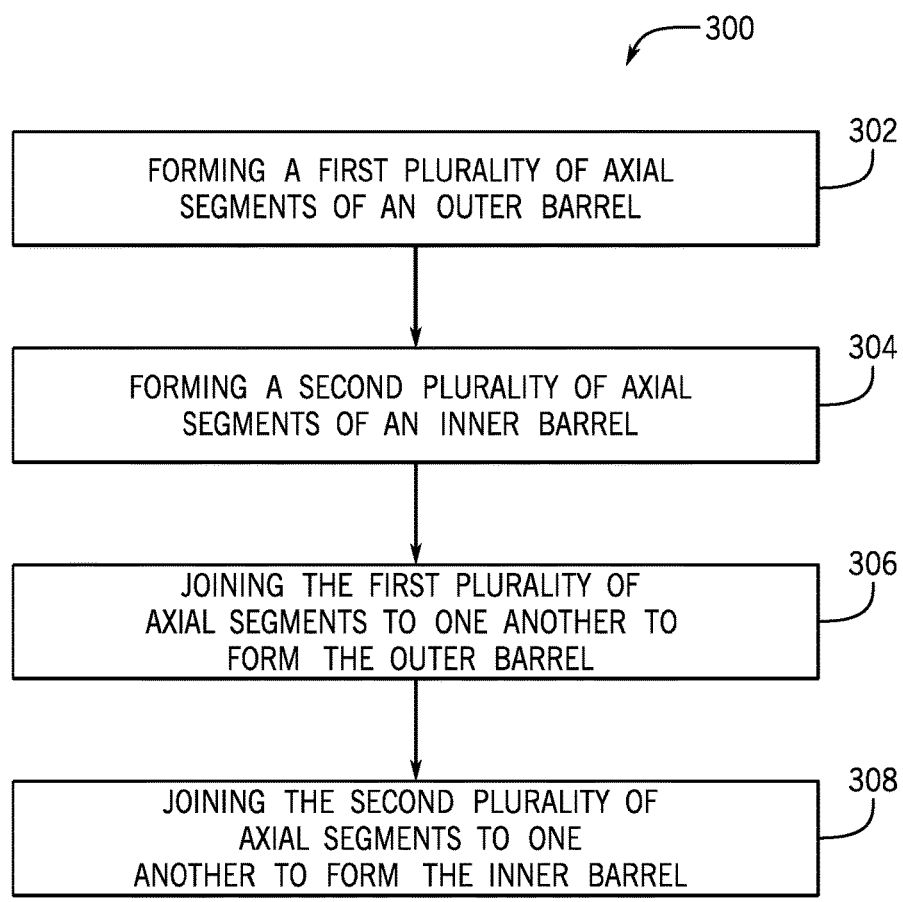
FIG. 16 illustrates a method of forming the inner barrel and the outer barrel by the spinning process.

FIG. 16 illustrates a method 300 of forming the inner barrel 48 and the outer barrel 50 by the spinning process. The spinning process, as described herein, may utilize a roller to spin about an axis of a mold or the mold may spin about the axis under the roller. As described above, the method 300 includes forming (block 302) a first plurality of axial forward plate segments of an outer barrel 50 by spinning a suitable material on the mold. As described above, the spinning process for each segment involves molding a suitable material (e.g., stainless steel, metal) into the desired shape by placing the material over a mold. The material is then molded into the desired shape by utilizing a roller to press the material into the mold, thereby gradually deforming the material the desired mold shape. The method 300 also includes forming (block 304) a second plurality of axial aft plate segments of an inner barrel 48 by spinning a suitable material on a mold. After the axial segments are formed, the method 300 includes joining (block 306) the first plurality of axial forward plate segments to one another to form the outer barrel 50 and joining (block 308) the second plurality of axial aft plate segments to one another to form the inner barrel 48. Both the inner barrel 48 and the outer barrel 50 are coupled to the gas turbine engine 18. As described above with respect to FIG. 7, a circumferential groove may be machined into the inner barrel 48.

Technical effects of the invention include improving traditional diffusers through utilization of mechanical improvements on the diffuser section. The mechanical improvements to the diffuser include an aft plate assembly with notches and ridges to facilitate axial installation of the aft plate to an inner barrel. The aft plate may be inserted axially through notches of a circumferential groove of the inner barrel of the diffuser section, then rotated circumferentially within the circumferential groove such that ridges axially retain the aft plate assembly. The mechanical improvements to the diffuser contribute to improved mechanical integrity of the diffuser by reducing stresses associated with a traditional diffuser design. The embodiments of the mechanical improvements include manufacturing a desired curvature of the diffuser, disposing a plurality of poles between a forward plate and the aft plate of the diffuser, a circumferential groove disposed in the inner barrel to receive the aft plate, a circumferential lap joint, a plurality of discrete brackets disposed along the inner barrel and the outer barrel of the diffuser configured to couple the diffuser to the turbine outlet, or any combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
    inserting axially a radially interior surface of an aft plate assembly into a circumferential groove of an inner barrel of a diffuser section downstream from a turbine section of a gas turbine along a rotational axis, wherein inserting axially comprises inserting the aft plate assembly into a first circumferential orientation relative to the circumferential groove, and the circumferential groove is disposed on a radially exterior surface of the inner barrel;
    rotating the aft plate assembly about an axis circumferentially within the circumferential groove from the first circumferential orientation to a second circumferential orientation, wherein the inner barrel is configured to axially retain the aft plate assembly when the aft plate assembly is disposed in the second circumferential orientation.

2. The method of claim 1, wherein the aft plate assembly comprises an annular aft plate assembly extending circumferentially about an axis of the inner barrel, and the circumferential groove extends circumferentially about the axis.

3. The method of claim 1, wherein the aft plate assembly comprises a plurality of aft plate segments.

4. The method of claim 3, comprising joining the plurality of aft plate segments together, wherein joining comprises welding, brazing, fusing, fastening, or any combination thereof.

5. The method of claim 1, wherein the aft plate assembly comprises a first plurality of notches and a first plurality of ridges on the radially interior surface, the circumferential groove comprises a downstream lip, and the downstream lip comprises a second plurality of notches and a second plurality of ridges.

6. The method of claim 5, wherein inserting axially the radially interior surface of the aft plate assembly into the circumferential groove of the inner barrel comprises inserting the first plurality of ridges through the second plurality of notches, and the second plurality of notches is configured to axially retain the first plurality of notches when the aft plate assembly is disposed in the second circumferential orientation.

7. The method of claim 5, wherein a radial ridge height between a root of a respective notch of the first plurality of notches and a crest of an adjacent respective ridge of the first plurality of ridges is less than a radial height of an upstream lip of the circumferential groove, wherein the first plurality of ridges are disposed between the upstream lip and the second plurality of ridges when the aft plate assembly is disposed in the second circumferential orientation.

8. The method of claim 1, comprising coupling a plurality of poles between the aft plate assembly and a forward plate of the diffuser section.

9. The method of claim 1, wherein the first circumferential orientation is circumferentially offset about an axis of the inner barrel from the second circumferential orientation by less than approximately 30 degrees.

10. A system comprising:
    a diffuser section configured to be positioned downstream from a turbine section to receive an exhaust gas from the turbine section, wherein the diffuser section comprises:
        an aft plate assembly comprising a radially interior surface, wherein the radially interior surface comprises a first notch and a first ridge; and
        an inner barrel comprising a circumferential groove disposed at least partially about an axis on a radially exterior surface, wherein the circumferential groove comprises:
            an upstream lip; and
            a downstream lip comprising a second notch and a second ridge,
        wherein the first ridge is configured to be disposed in the circumferential groove when the aft plate assembly is disposed in a first circumferential orientation and a second circumferential orientation relative to the inner barrel, the first ridge is axially aligned along the axis with the second notch in the first circumferential orientation, and the first ridge is circumferentially offset about the axis relative to the second notch in the second circumferential orientation.

11. The system of claim 10, wherein the aft plate assembly comprises a plurality of aft plate segments.

12. The system of claim 11, wherein the plurality of aft plate segments are joined together to form an annular aft plate assembly, and the plurality of aft plate segments are joined together by at least one of a welded joint, a brazed joint, a fused joint, and a fastened joint, or any combination thereof.

13. The system of claim 10, wherein the radially interior surface comprises a first plurality of notches and a first plurality of ridges, the radially exterior surface comprises a second plurality of notches and a second plurality of ridges, wherein the first plurality of ridges is axially aligned with the second plurality of notches in the first circumferential orientation, and the first plurality of ridges is axially aligned with the second plurality of ridges in the second circumferential orientation.

14. The system of claim 10, wherein a radial ridge height between a root of the first notch and a crest of the first ridge is less than a radial height of the upstream lip of the circumferential groove.

15. The system of claim 10, wherein the diffuser section comprises:
   a forward plate; and
   a plurality of poles coupled to the forward plate and the aft plate assembly when the aft plate assembly is disposed in the second circumferential orientation.

16. The system of claim 10, wherein the first circumferential orientation is circumferentially offset from the second circumferential orientation by less than approximately 30 degrees.

17. A system comprising:
   a diffuser section configured to be positioned downstream from a turbine section to receive an exhaust gas from the turbine section, wherein the diffuser section comprises:
      a forward plate;
      an aft plate assembly comprising a radially interior surface, wherein the radially interior surface comprises a first plurality of notches and a first plurality of ridges; and
      an inner barrel comprising a circumferential groove disposed at least partially about an axis on a radially exterior surface, wherein the circumferential groove comprises:
         an upstream lip; and
         a downstream lip comprising a second plurality of notches and a second plurality of ridges, and
      a plurality of poles coupled between the forward plate and the aft plate assembly when the aft plate assembly is disposed in a second circumferential configuration relative to the inner barrel;
   wherein the first plurality of ridges is configured to be disposed in the circumferential groove when the aft plate assembly is disposed in a first circumferential orientation and the second circumferential orientation relative to the inner barrel, the first plurality of ridges is axially aligned along the axis with the second plurality of notches in the first circumferential orientation, and the first plurality of ridges is circumferentially offset about the axis relative to the second plurality of notches in the second circumferential orientation.

18. The system of claim 17, wherein the aft plate assembly comprises a plurality of aft plate segments joined together to form an annular aft plate assembly, and the plurality of aft plate segments are joined together by at least one of a welded joint, a brazed joint, a fused joint, and a fastened joint, or any combination thereof.

19. The system of claim 17, wherein a crest of a first ridge of the first plurality of ridges is configured to interface with a root of the circumferential groove at a 12 o'clock position when the aft plate assembly is disposed in the second circumferential orientation relative to the inner barrel.

20. The system of claim 17, wherein each pole of the plurality of poles comprises a diameter, and the diameter of each pole is based at least in part on a circumferential location of the respective pole about an axis of the diffuser section.

* * * * *